(12) United States Patent
Ryabov et al.

(10) Patent No.: US 10,521,189 B1
(45) Date of Patent: Dec. 31, 2019

(54) VOICE ASSISTANT WITH USER DATA CONTEXT

(71) Applicant: Synqq, Inc., Sunnyvale, CA (US)

(72) Inventors: Andrey Ryabov, Sunnyvale, CA (US); Ramu Sunkara, Los Altos, CA (US); James Shelburne, San Jose, CA (US); Sergey Yuryev, St Petersburg (RU)

(73) Assignee: Alan AI, Inc., Sunnyvale, CA (US)

( * ) Notice: Subject to any disclaimer, the term of this patent is extended or adjusted under 35 U.S.C. 154(b) by 0 days.

(21) Appl. No.: 15/860,580

(22) Filed: Jan. 2, 2018

Related U.S. Application Data

(63) Continuation-in-part of application No. 15/686,031, filed on Aug. 24, 2017, and a continuation-in-part of application No. 14/977,567, filed on Dec. 21, 2015, now abandoned, and a continuation-in-part of application No. 14/709,137, filed on May 11, 2015, now Pat. No. 9,942,177.

(60) Provisional application No. 62/441,869, filed on Jan. 3, 2017.

(51) Int. Cl.
*H04L 29/06* (2006.01)
*G06F 3/16* (2006.01)
*G06F 17/27* (2006.01)
*H04M 1/725* (2006.01)
*G10L 15/26* (2006.01)
*G10L 15/22* (2006.01)

(52) U.S. Cl.
CPC .......... *G06F 3/167* (2013.01); *G06F 17/2775* (2013.01); *G10L 15/22* (2013.01); *G10L 15/265* (2013.01); *G10L 2015/223* (2013.01); *H04M 1/72522* (2013.01); *H04M 1/72583* (2013.01)

(58) Field of Classification Search
CPC .................. G06F 17/2775; H04L 67/1088
See application file for complete search history.

(56) References Cited

U.S. PATENT DOCUMENTS

2014/0259071 A1\* 9/2014 Chang ................ H04N 21/2385
725/45

\* cited by examiner

*Primary Examiner* — Adnan M Mirza
(74) *Attorney, Agent, or Firm* — Prasad IP, PC

(57) ABSTRACT

A mobile device includes a plurality of physical buttons for providing programmable control inputs to the mobile device. A processor within the mobile device is programmed with instructions to cause the mobile device to respond to a first input via a first of the plurality of physical buttons by activating voice recognition by the mobile device and providing an indication on a status bar on a screen of the mobile device. The mobile device accepts voice inputs and processes the voice inputs locally and via interactions with a remote server to provide contextualized information within an application executing on the mobile device.

17 Claims, 19 Drawing Sheets

| Permanent Smart Tags | Virtual Smart Tags |
|---|---|
| Names/People: John, Ramu, Nelly, Michael, . . . | Shared, My, Read, Unread, Received, From, New |
| Location: Reamwood Ave, Moscow, Sunnyvale, . . . | |
| Links: JIRA, Web Link, Dropbox, Google Doc, . . . | |
| Company: IBM, Synqq, . . . | |
| Keywords: proposition, idea, Sankara, . . . | |
| Type: Text, Voice, Image, . . . | |

FIG. 5

VOICE ASSISTANT WITH USER DATA CONTEXT

RELATED APPLICATIONS

This application claims the benefit of the following pending U.S. utility and provisional patent applications:

Ser. No. 14/709,137, filed on May 11, 2015, entitled "Method and System for Real-Time Data Updates";

Ser. No. 14/977,567, filed on Dec. 21, 2015, entitled "Computerized System and Method for Capturing and Contextually Retrieving Interactions and Generating an Interaction Graph;

No. 62/441,869, filed on Jan. 3, 2017, entitled "Contextual Voice Activated Application Control and Data Input"; and Ser. No. 15/686,031, filed on Aug. 24, 2017, entitled "Computerized Method and System for Automatically Tagging Interactions and Providing Contextualized Information.

FIELD OF THE DISCLOSURE

This disclosure relates to computerized information systems and more particularly to processing and recognition of voice inputs by computerized information systems.

BACKGROUND

Today mobile phones are used mostly for content consumption. While mobile phones are portable and extremely useful for communication and content consumption, it is relatively difficult to input content and obtain information from a mobile phone. The small keyboard leads to regular errors in inputting information and generally requires use of both hands. Error correction and prediction techniques that are commonly used to facilitate typing on the small virtual keyboards on most smartphones help a bit but are still quite error prone and still require use of both hands for effective typing. Use of a full-size keyboard makes data entry much easier but sacrifices portability and requires use of both hands.

Mobile apps simplify use of a mobile phone by providing a simple user interface to facilitate navigation, and by providing forms to fill by typing. For example, in an app like Yelp, a user can navigate by touching different icons and later complete a form to find, for example, a nearby restaurant called Sweet Tomatoes. This is generally done by typing in information, which typically requires a user to use both hands, which, as noted above, continues to be error prone. Voice input such as provided by systems such as Alexa by Amazon, Siri by Apple, or Cortana by Microsoft facilitate input to mobile phones but such systems regularly provide inaccurate information. What is needed are improved systems and methods to input information into mobile devices, and particularly, hand-held devices such as mobile phones, in a simple and intuitive manner.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques. Specifically:

FIG. 5 illustrates examples of various types of Smart Tags.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
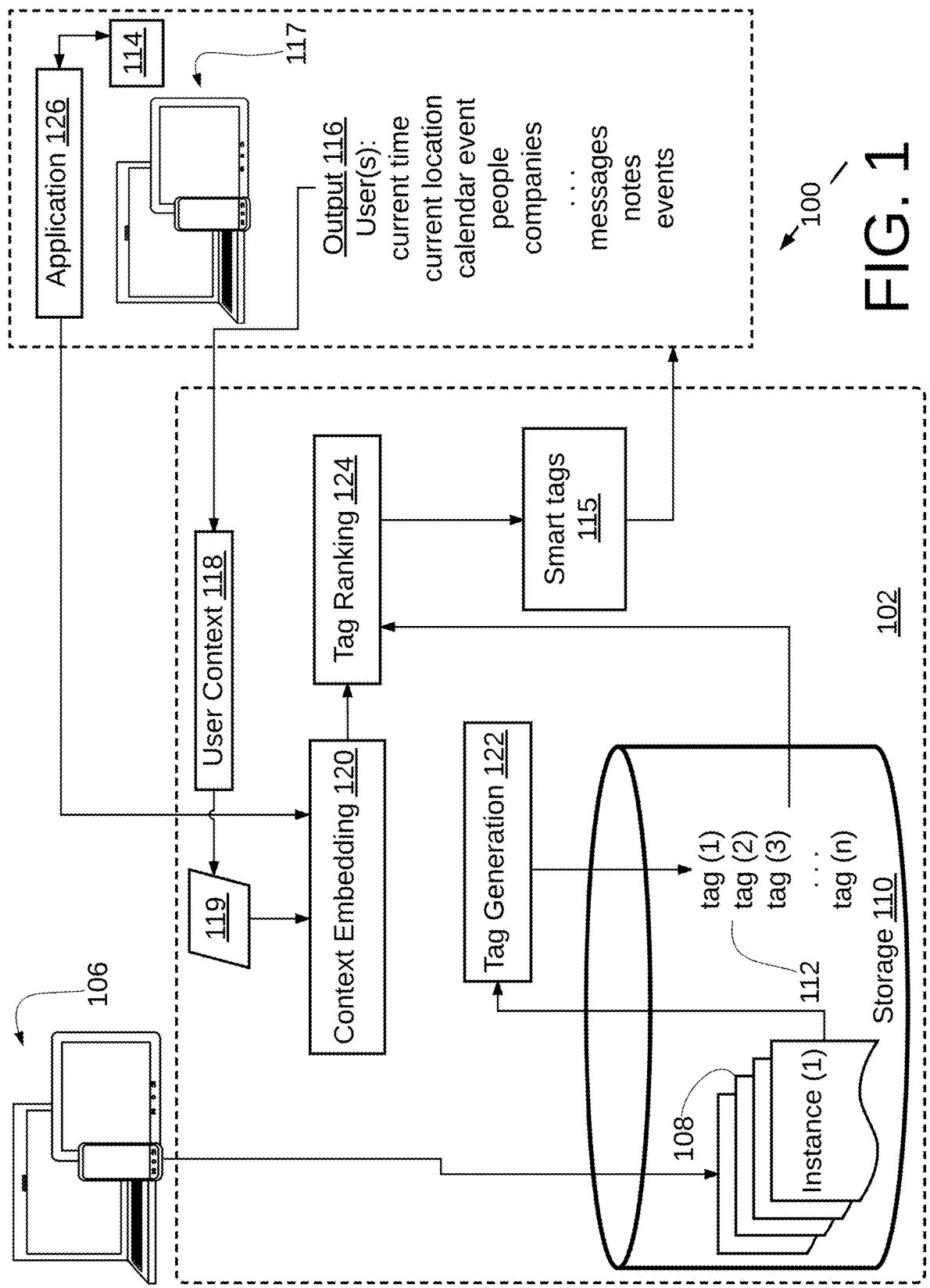
FIG. 1 is a high-level block diagram that illustrates, at a high level, operation of an embodiment of a Smart Tag System (STS) that may be employed in certain embodiments.

FIG. 1 is a high-level block diagram that illustrates, at a high level, operation of an embodiment of a Smart Tag System (STS) 100 that may be employed in certain embodiments. In FIG. 1, a Server 102 receives digitally encoded content from one or more computing devices 106. The computing devices 106 generate a variety of instances 108 of digitally encoded content which are stored by server 102 in digital storage 110. The digitally encoded content 108 may represent a variety of content including, but not limited to, text documents, web pages, e-mails and other messages, calendar data, images, and audio and video recordings. The term "instance" as used herein in connection to content refers to content that the STS 100 treats as a discrete portion of content such as an individual file or perhaps a portion within a file, such as for example, a calendar entry. The digitally encoded content 108 is shown as being stored by STS 100, but in other embodiments the digitally encoded content 108 may be stored elsewhere. In such embodiments, STS 100 processes the content 108 to generate tags 112 as described below but does not necessarily store any of the content 108. Digital storage 110 is shown generally but can take a variety of forms of storage for digital content including storage that is spread physically across numerous storage devices and also that is partially or wholly distant physically from other portions of system 100.

The STS 100 operates as described herein to generate tags 112 from the instances of digitally encoded content 108 and to provide a user 114 with Smart Tags 115 to assist the user in identifying relevant content within an application. As used herein, the term "tag(s)" refers to textually encoded representative of information in an instance of information, such as a document, image or video file, an e-mail or other type of message, or a calendar entry. As used herein, the term "Smart Tag(s)" refers to one or more, textually encoded tag(s) that are associated with user contextual information, as further described herein, along with a ranking value, as further described herein. The user 114 interacts with STS 100 by way of a digital device such as a laptop, smart phone or tablet, seen generally at 117. A single user 114 is shown in FIG. 1 for purposes of illustration. The STS 100 generally will support many users who may supply content via devices 106. In general, any device 106 and associated user may constitute device 117 and associated user 114.

Devices 117 are capable of generating a variety of contextual information 116 regarding the user 114 including location of the user such as via GPS, any meeting in which the user 114 may be engaged such as via a calendar event, people with which the user is associated, companies with which the user associates, messages the user has sent and received, Notes the user has sent and received, and events the user has attended or will attend. This type of contextual information 116 is received by user context engine 118 to generate a user context vector 119 which contains information indicative of the user context. The user context vector 119 generated by user context engine 118 is employed by context embedding engine 120, which receives tags 108 generated by tag generation engine 122 to provide tag ranking engine 124 with context for each tag 112 provided to tag ranking engine 124. Tag ranking engine 124 provides to user 114 a plurality of Smart Tags 115 to an application 126 used by user 114. For each webpage presented to the user 114 by the application 126 the STS 100 provides a set of Smart Tags 115 which may be selected by the user to assist in searching for relevant content.

The term "user context" as employed herein refers to information regarding the user that provides context regarding any data generated by or in connection with the user. For example, the location of the user may provide context regarding data generated by or for the user. A note generated by Bob while in Boston may be tagged and hence provide context with the location "Boston". If Bob is in a meeting in Boston and generates a note regarding the meeting then the note may be tagged as pertaining to the meeting. If Bob receives an email from an attendee at the meeting then that email may be tagged as being received from the sender and hence may be shown as being related to the meeting. These tags provide a context to the underlying information (e.g. location, notes, e-mails, attendees) and assist Bob later on, perhaps many weeks months or years later, to retrieve information pertaining to the meeting, his trip to Boston, any of the attendees attending the meeting, or any of the information generated relating to the meeting.

Application 126 may be any software implemented application that operates in to provide user 114 with information. One example of application 126 is the Synqq application available from Synqq, Inc., Sunnyvale, Calif. The Synqq application receives information from a variety of sources, such as calendars, e-mail, GPS, notes and permits a user to view the information in a variety of modes explained in further detail herein. The application 126 though may take a variety of forms where information is provided to a user 114. In general, application 126 will benefit most from the STS 100 where the application 126 has available a large amount of data that may be provided to the user and where the data may be tagged with contextual information to permit selection by the user of tags of interest. Other examples of the application 126 include, but are not limited to: online shopping sites, social networking sites, enterprise applications such as enterprise resource planning and customer relationship management, calendaring applications, e-mail applications, and messaging applications.

Figure 2:
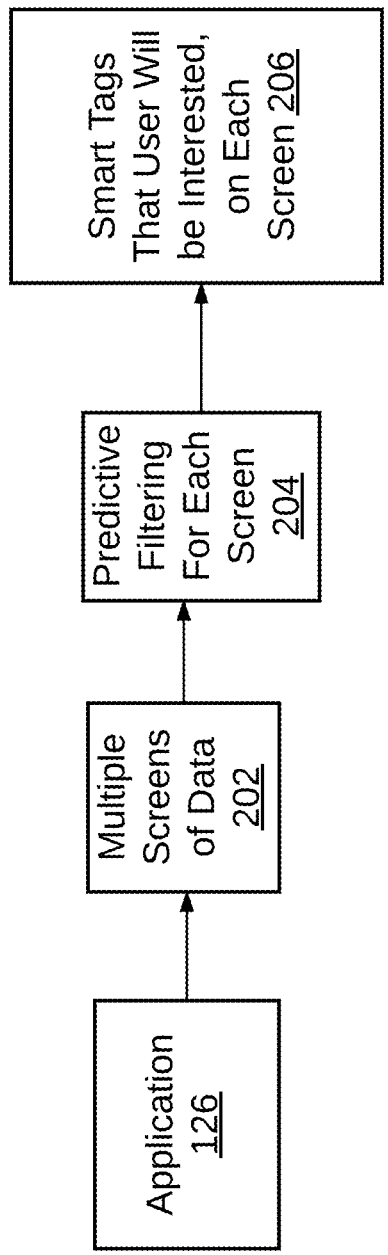
FIG. 2 is a high-level flow diagram illustrating overall operation of the STS.

FIG. 2 illustrates use of Smart Tags 115 such as generated by STS 100 by any one of the foregoing applications. As seen in FIG. 2, at 202, application 126 generates multiple screens of data. Each of the screens of data may be a webpage encoded in a markup language such as HTML or a native implementation on iOS and Android. As seen at 204, STS 100 receives each screen of data as it is viewed by the user and performs predictive filtering for each screen. At 206, STS 100 then generates Smart Tags for display in connection with display of data by the application 126. Turning back to FIG. 1, context embedding engine 120 receives selections of Smart Tags 115 from user 114 in application 126 and updates the context for each tag 112. This advantageously permits dynamic updating of ranking of the Smart Tags 115 presented to the user 114 while using the application 126. The user 114 may therefore interactively select Smart Tags 115 presented via application 126 to receive desired information as filtered by selected Smart Tags 115.

The Smart Tags 115 may be provided to applications operating in a variety of environments including on laptops/desktops, tablets and mobile phones. The Smart Tags 115 provide a particular benefit for applications operating on mobile phones. Many mobile phones have capabilities to provide a great deal of information that can be employed by the STS 100 to generate contextual information for user context module 118. Examples of such contextual information include identification of people, location of the phone as well as others from GPS, Wi-Fi, names of conference rooms and Bluetooth communications, and time, via underlying capabilities existent on most mobile phones such as location services, date and time. The Smart Tag capabilities executing on the mobile device (or laptop/desktop, tablet) sends the captured information to a server that provides a rich processing and machine learning to generate the appropriate Smart Tags, such as via STS 100. The client application employs information received from the cloud server to provide relevant tags to the smart phone user.

An application employing the principles described herein enables filtering of content with just a few taps on the mobile phone screen. In certain embodiments, the user experience may proceed as follows:

Timeline: A timeline is presented and Smart Tags 115 on the timeline are pre-populated based on the meetings the user has on the current date. Meetings will typically have associated with them a) people, b) location, c) companies, d) topics, and e) type of events. Smart Tags 115 are derived from these properties. For example: the user 114 has a meeting with "Bill Jones" today. A Smart Tag 115 will now show Bill in the Smart Tags section of the applications user interface. With just one tap on "Bill Jones" tag, the user 114 will instantly see all the meetings they have had with Bill Jones. The STS 100 will also provide the application 126 with a recalculation of the order of the tags based on the user 114's previous selection.

Notes: Smart Tags 115 are based on the notes content and the current context of today's meetings like location, people, companies, and meeting title.

People: Smart Tags 115 are based on people the user 114 has recently met, locations, and companies, as well as people, locations, and companies from today's meetings. Here, the STS 100 also sorts tags so that the most relevant ones are at the top of the list.

The STS 100 operates by determining based on the user "Context", mobile phone (GPS, Wi-Fi, Bluetooth) context, the users notes, and meetings content, the relevant Smart Tags for People, Location, Topic, Event title, Meeting description to present to the user 114. The STS 100 also analyzes URL content and provides specific Smart Tags for the user 114. The STS 100 ranks the tags based on their relevancy to the current context, location, and the user's content. These are the most likely search tags for the current context. For example, if the user 114 is meeting with Bill Jones, the application's People section will only show the other people the user 114 has met with Bill, the tags from the notes the user 114 has collected with Bill, and the locations the user 114 met with Bill.

Advantageously, the user 114 is generally only shown a small number of relevant Smart Tags to search by default. These Smart Tags are the most likely ones the user is interested at the moment. This approach allows the STS 100 to enable the application 126 to provide the most valuable content for each user. The user 114 then taps on the appropriate Smart Tags 115 to see the corresponding content from Notes, Timeline, and People. Once the user selects a Smart Tag 115, the relevance of other Smart Tags 115 is dynamically computed and presented to the user 114. The STS 100 dynamically generates the relevant Smart Tags 115 for the search.

The STS 100 knows which Smart Tags 115 the user 114 previously selected and uses these selections to calculate rank for Smart Tags 115. The STS 100 provides Smart Tags 115 that were valuable for past context which are also useful in the current context—based on context and on user 114 selections. The user 114 can also refine search by typing in a query in addition to selected Smart Tags 115. This enables users to find initial results, then dig deeper into them more quickly.

The above operations generate a significant number of tags 112 for each instance 108 of content. For each tag 112, a probability is computed that this tag will be of interest to a user 114. For example, the STS 100 takes current time, location, meetings, people based on the probability of each of the tags 112 in a sorted order for People, Location, etc.

The sorted order of tags 112 is computed for each user 114 and further ordered in the level of importance for the current context. If the user 114 clicks on one Smart Tag 115, then the STS 100 calculates the other Smart Tags 115 based on, in certain embodiments, a vector space model which generates a probability of the new Smart Tags 115 to show after the initial selection. This makes the other Smart Tags 115 even more relevant from the current selection. An example of a vector space model is provided in G. Salton, A. Wong, and C. S. Yang (1975), "A Vector Space Model for Automatic Indexing," Communications of the ACM, vol. 18, nr. 11, pages 613-620.

The STS 100 disclosed herein provides a number of benefits. There is no requirement of predefined tags. Unlike conventional e-commerce sites that require predefined tags. Moreover, in certain embodiments, the STS 100 generates context relevant tags by preparing Smart Tags 115 for each individual user 114 based on the user's notes content and the current context. The current context is generally a combination of time, location for meeting, location of notes taken/shared from the meeting, people nearby based on Wi-Fi access point, GPS and/or Bluetooth, meeting title, and companies the user 114 is meeting with. The Smart Tags 115 are therefore dynamic. These Smart Tags 115 are automatically generated thereby relieving the user from generating tags 112. Moreover, the STS 100 provides automatic tagging of content. Each of the user's notes content is automatically tagged as follows:

Type—text, audio, pictures, video
Content inside the note like URL, Document links, etc.
People: who created/shared the note
Companies
Meeting title and description
Location: where the note is taken and where was the meeting The above operations advantageously enable users to find the most relevant notes, events and people for the current situation faster and easier than the current approaches.

The STS 100 described herein may be implemented in conjunction with and utilize many of the functions described in pending U.S. patent application Ser. No. 14/709,137, filed on May 11, 2015, entitled "Method and System for Real-Time Data Updates" which is hereby incorporated by reference.

Figure 3:
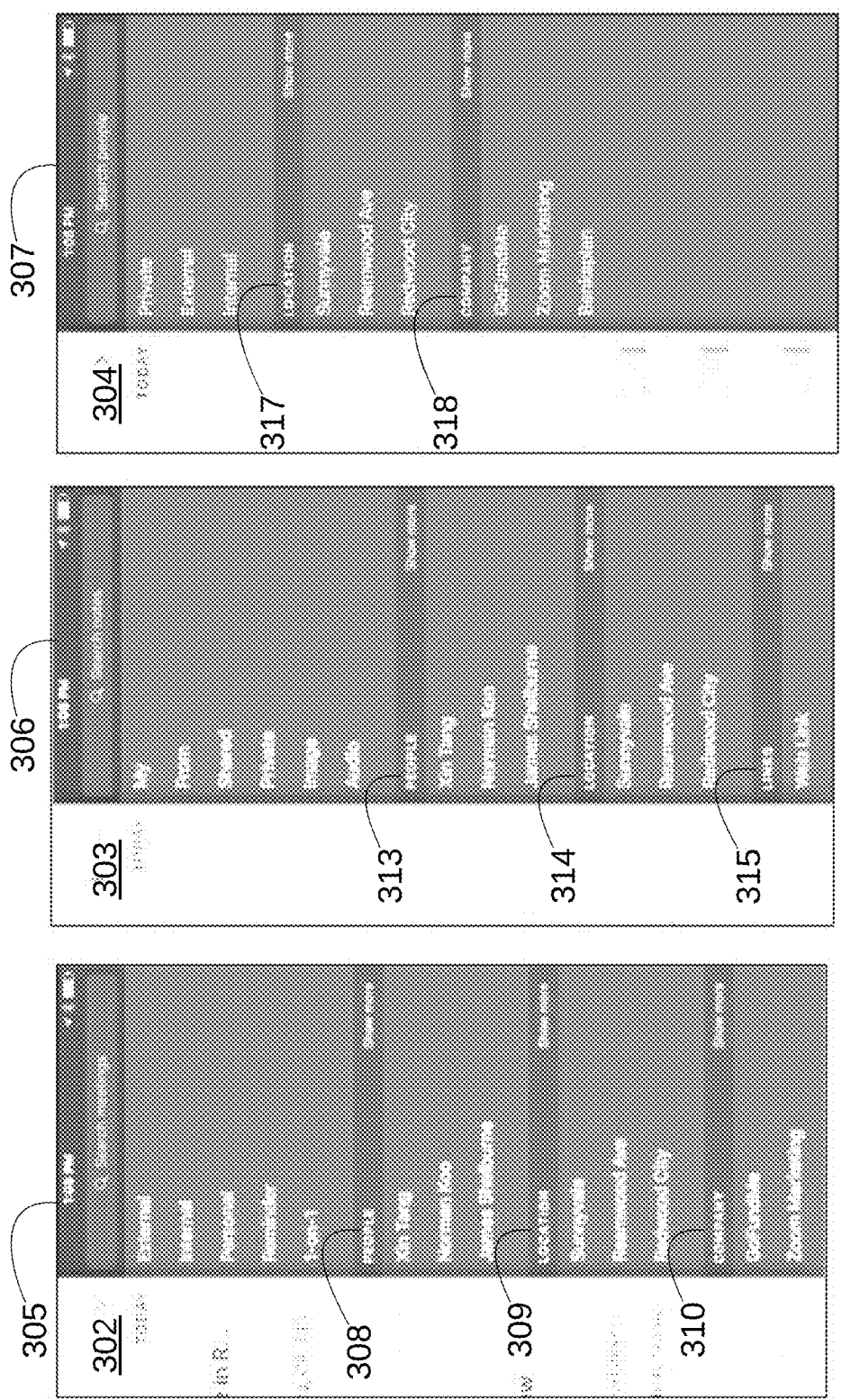
FIGS. 3A, 3B and 3C are screenshots illustrating Smart Tags in conjunction with an application.

FIGS. 3A, 3B and 3C are screenshots illustrating Smart Tags in conjunction with an application. In FIGS. 3A, 3B and 3C, there are shown three different screens generated by the SYNQQ application executing on a mobile phone. In each of FIGS. 3A, 3B, 3C, there is an application screen, 302, 303, 304, with a corresponding Smart Tag screen, 305, 306, 307. An event screen is seen in FIG. 3A, a notes screen is seen in FIG. 3B and a people screen is seen in FIG. 3C. The application screens 302, 303, 304 are each shown partially on the left side of the figure with the corresponding Smart Tag screen shown to the right of the figure. The application shown in FIGS. 3A, 3B, 3C permits the user 114 to move the application screen with their finger to display either the application screen entirely, or as seen in FIGS. 3A, 3B and 3C, to partially expose the application screen 302 and fully expose the associated Smart Tag screen.

The STS 100 generates the Smart Tags screen 305 to display Smart Tags associated with past or upcoming events that may be shown in screen 302 associated with the user 114. The events Smart Tag screen 305 displays a variety of the Smart Tags 115 generated by STS 100 to permit the user 114 to search for information in the event screen 302. For example, the events in the event screen 302 were categorized as one of five types of events: external, internal, personal, reminder, one-on-one. These are virtual Smart Tags 115. Associated with each event are displayed various people tags 308, location tags 309, and company tags 310. The Tag Ranking algorithm decides on the relevancy order of the tags presented. The user 114 may select one or more of the displayed Smart Tags 115 shown in screen 305 to search for desired information pertaining to events captured by the application 126.

FIG. 3B shows a note screen 303 that may be used by the user 114 to capture and/or view various notes, in a variety of forms such as text, audio, image, video or a combination of the foregoing. Associated Smart Tag screen 306 provides four categories of Smart Tags for the note screen 303. The note type Smart Tags comprise four Virtual tags: My, From, Shared, Private, Image, Audio. The people Smart Tags 313 show three people identified by STS 100 in connection with the notes stored by the application 126, or accessible to the application 126. The location Smart Tags 314 show three locations associated with notes stored by or accessible by application 126. The links Smart Tags 315 show one URL link associated with notes stored by or accessible by application 126.

FIG. 3C shows a people screen 304 that may be used by the user 114 to capture and/or view people with whom the user 114 has interacted with or will interact with. Associated Smart Tag screen 307 provides three categories of Smart Tags for the people screen 304. The people type Smart Tags are virtual tags and comprise three types: Private (individuals designated by the user as personal to the user, External (i.e., those outside the user 114's organization) and Internal (i.e., those within the user 114's organization). The location Smart Tags 317 show three locations associated with people stored by or accessible by application 126. The Company Smart Tags 318 show three companies associated with people stored by or accessible by application 126.

The STS 100 regenerates the displayed set of Smart Tags for each of the screens 305, 306, 307 seen in FIGS. 3A, 3B, 3C as the user selects various Smart Tags in the smart tag screens 305, 306, 307. The Smart Tags 115 generated by the STS 100 in response to selection by the user 114 also causes the application 126 to display information selected by the Smart Tags 115 by the user 114 in relevant order on each screen of the application.

The foregoing descriptions of Smart Tag types and other Smart Tags generated by STS 100 in connection with application 114 are merely illustrative. Other applications will have different types of data and associated screens for such data with different Smart Tag types, and different data associated with the various Smart Tags 115 generated by STS 100. Moreover, other applications may have more screens with different content and in different form factors such as for a laptop or desktop or tablet may also be used in connection with the STS 100.

Figure 4:
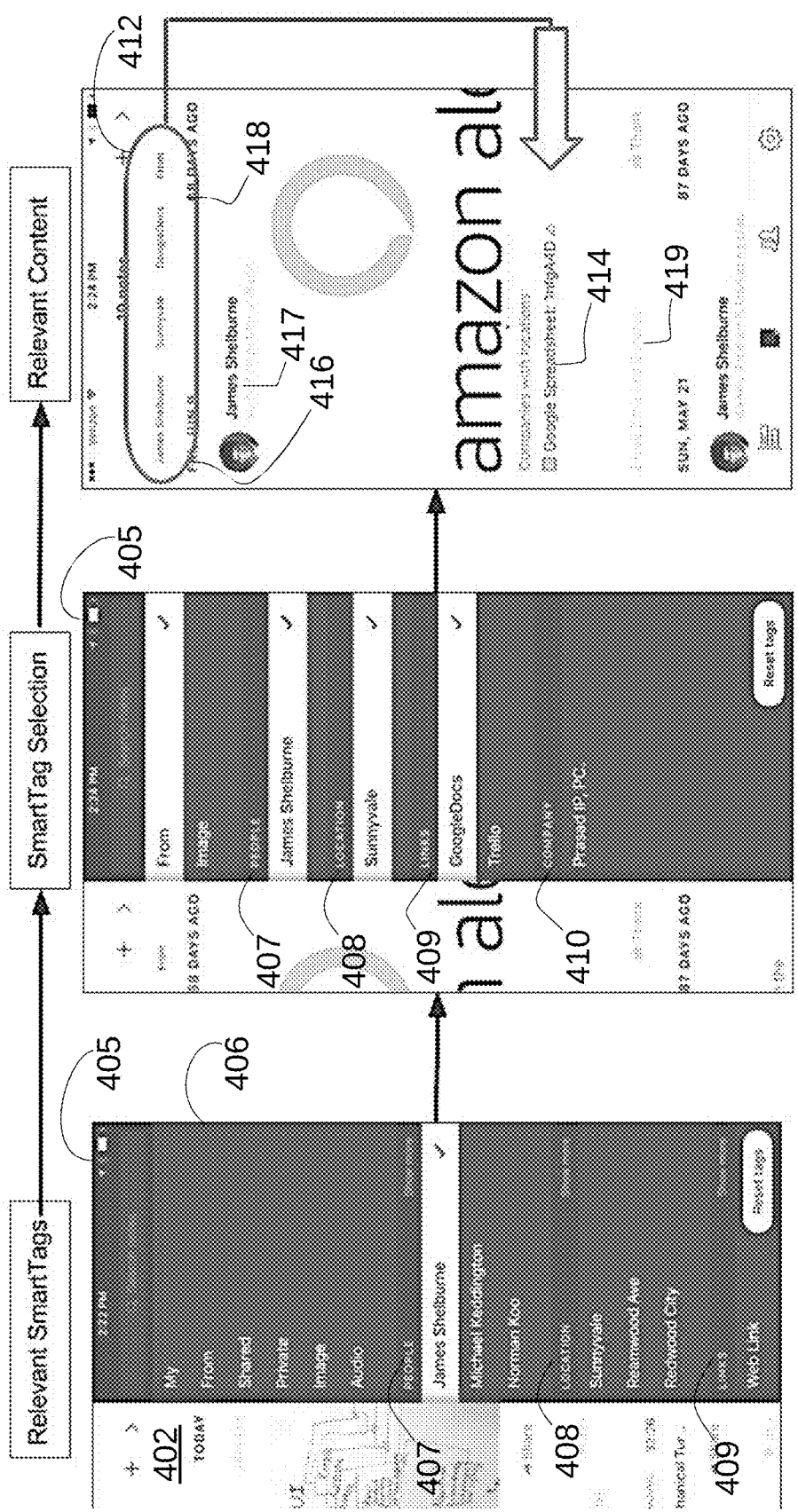
FIGS. 4A, 4B and 4C are screenshots illustrating Smart Tag selection and consequent display of content by an application.

FIGS. 4A, 4B and 4C are screenshots illustrating Smart Tag 115 selection and consequent display of content by an application 126. In FIG. 4A, an application screen 402 is seen partially exposed to the left. The STS 100 generates in response to the data stored by the application 126 or accessible by the application 126 in connection with the application screen 402 the Smart Tag screen 405, which includes Smart Tag types 406 comprising the following types: My, From, Shared, People, Image, Audio. The Smart Tag screen 405 also includes People tags with three people shown, Location tags with three locations shown, and Links tags with one URL link shown. In FIG. 4A, in the People Smart Tags 407 the individual "James Shelburne" is selected. The STS 100 responds as shown in FIG. 4B to the selection shown in FIG. 4A of the Smart Tag "James Shelburne" in the People Smart Tag field by generating Smart Tags associated with this Smart Tag. The top 3 Smart Tags presented in any category are the most likely ones to be selected by the user (based on the dimension used in the Vector Space model). As seen, the STS 100 changes the Smart Tag type field from that shown in FIG. 4A, containing the aforementioned Smart Tag types to two Smart Tag types, From and Image. In the People tags, there is only shown "James Shelburne," though others could be shown if associated with "James Shelburne." The STS 100 generates location(s) Smart Tags 408 associated with "James Shelburne," in this case, one location, two Links Smart Tags 409, and one company Smart Tag.

In FIG. 4B, four Smart Tags are shown selected by user 114: From, James Shelburne, Sunnyvale, GoogleDocs. This selection causes display of the information by application 126 shown in FIG. 4C. The Smart Tags 115 selected in FIG. 4B are shown displayed across the top of the screen at 412. The resulting information retrieved by the application 126 in response to the selected Smart Tags 115 is shown at 414, the URL for the file shown at 414. As seen, context regarding the retrieved information is also shown such as date 416, the originator, 417, the number of days elapsed since the document was generated and the number of people that read the document, thanked the author and that shared the document 419.

The Smart Tags generated by STS 100 may take two general forms as seen in FIG. 5. One form is a permanent Smart Tag seen at 502 and the other is a virtual Smart Tag seen at 504. Permanent Smart Tags 502 are Smart Tags that have a permanence, in other words, that do not change regularly. For example, identification of individuals (Names/People), locations (Location), URL links (Link), company names (Company), keywords regarding various instances 108 (Keywords), data type, such as text, audio, image (Type). Virtual Smart Tags 504 are Smart Tags that can change based on passage of time or user action. For example, the Smart Tag pertaining to whether a document is shared will change when the document becomes shared or unshared. The ownership of a document will change from say, My, to another value if ownership changes. Whether a document is designated as "read" or "unread" will change when it is read. A document that has not yet been received by anyone will have a different Smart Tag than one that that has been received. These are merely some examples of virtual tags.

Figure 6:
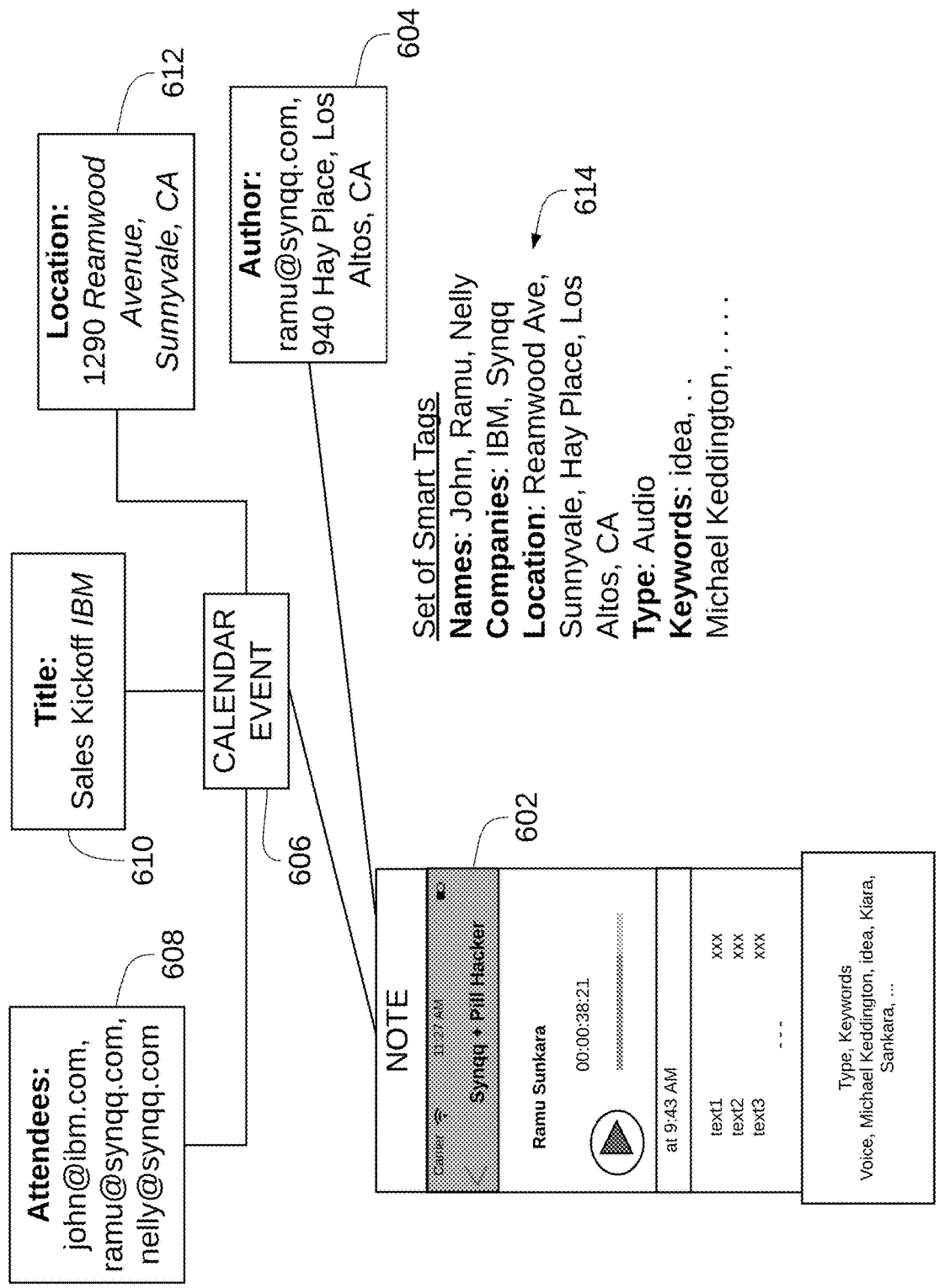
FIG. 6 illustrates generation of Smart Tags in connection with a user entry of a note in the form of an audio recording.

FIG. 6 illustrates generation of Smart Tags in connection with a user 114 entry of a note in the form of an audio recording. The note 602 includes an audio recording generated by an author 604. The note 602 is associated with the calendar event 606 which has associated therewith, among other things, a plurality of attendees 608, a title 610, and location 612. The STS 100 responds to generation of the note 602 in association with the calendar event 606 by generating the set of Smart Tags shown at 614:
Names: John, Ramu, Nelly
Companies: IBM, Synqq
Location: Reamwood Ave, Sunnyvale, Hay Place, Los Altos, Calif.
Type: Audio
Keywords: idea, Michael Keddington The Smart Tags 115 shown above that are generated by the STS 100 may be subsequently used to retrieve information regarding any of the smart tag types shown above. For example, a search for the names John, Ramu, or Nelly will retrieve the calendar event 606 and the note 602, along with the other attendees, other events occurring at the locations tagged, other audio files, other information associated with the companies IBM, Synqq, and other instances 108 associated with the keywords idea, or Michael Keddington. Alternatively, a search for any of the other tags will cause retrieval of other instances 108 associated with any of the Smart Tags 115 shown at 614.

Figure 7:
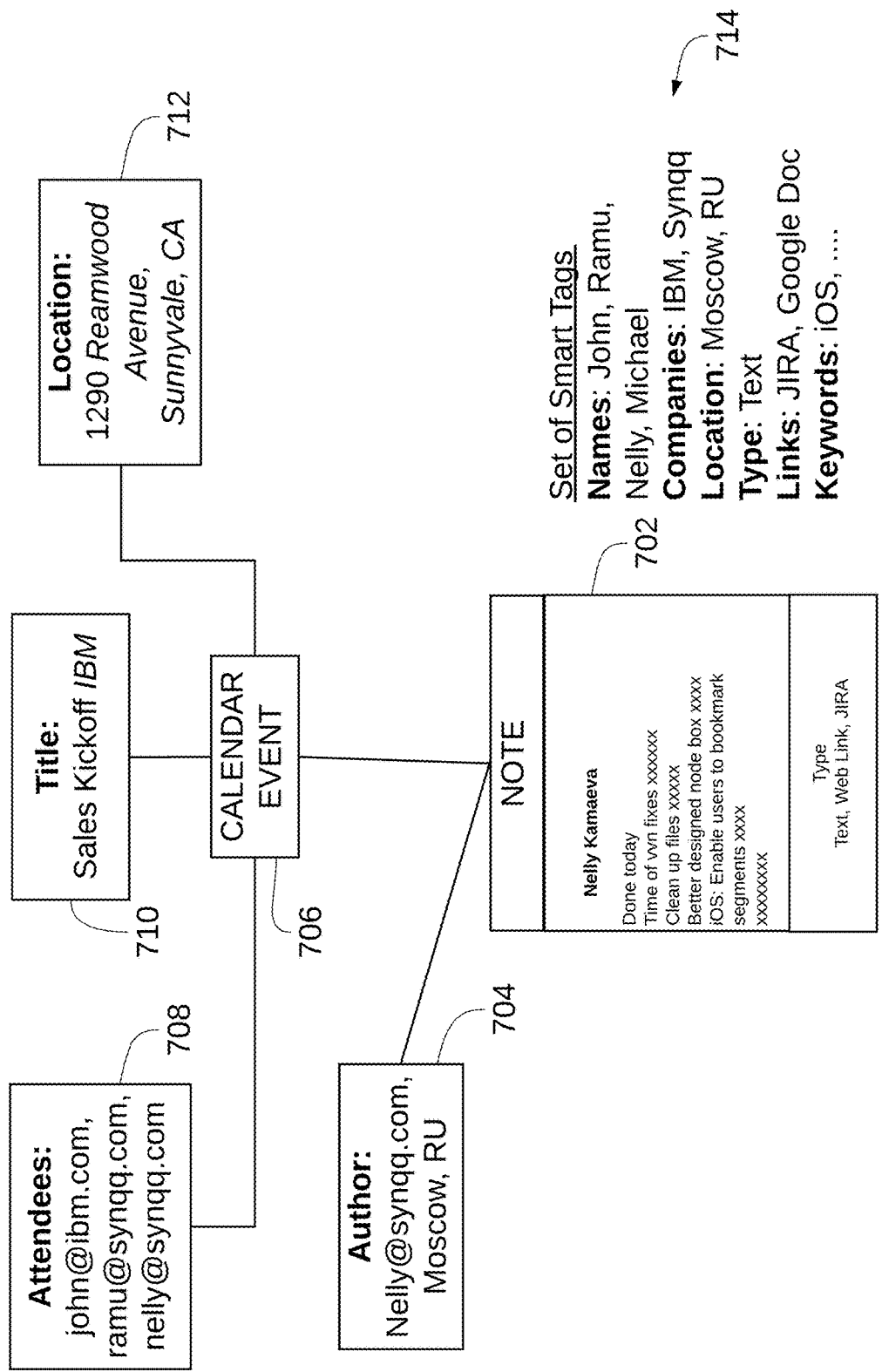
FIG. 7 illustrates generation of Smart Tags in connection with a user entry of a note in the form of text data entry.

FIG. 7 illustrates generation of Smart Tags in connection with a user 114 entry of a note in the form of text data entry. The note 702 includes a text note typed in by an author 704. The note 702 is associated with the calendar event 706 which has associated therewith, among other things, a plurality of attendees 708, a title 710, and location 712. The STS 100 responds to generation of the note 702 in association with the calendar event 606 by generating the set of Smart Tags shown at 714:
Names: John, Ramu, Nelly, Michael
Companies: IBM, Synqq
Location: Moscow, RU, . . .
Type: Text
Links: JIRA, Google Docs, . . .
Keywords: iOS, . . .

The Smart Tags 115 shown above that are generated by the STS 100 may be subsequently used to retrieve information regarding any of the Smart Tag types shown above in the manner explained above in connection with FIG. 6. It should be noted that the Smart Tags 115 shown in connection with FIGS. 6 and 7 are merely illustrative and are not an exhaustive representation of all of the tags that may be generated by the STS 100 in response to the data shown.

Figure 8:
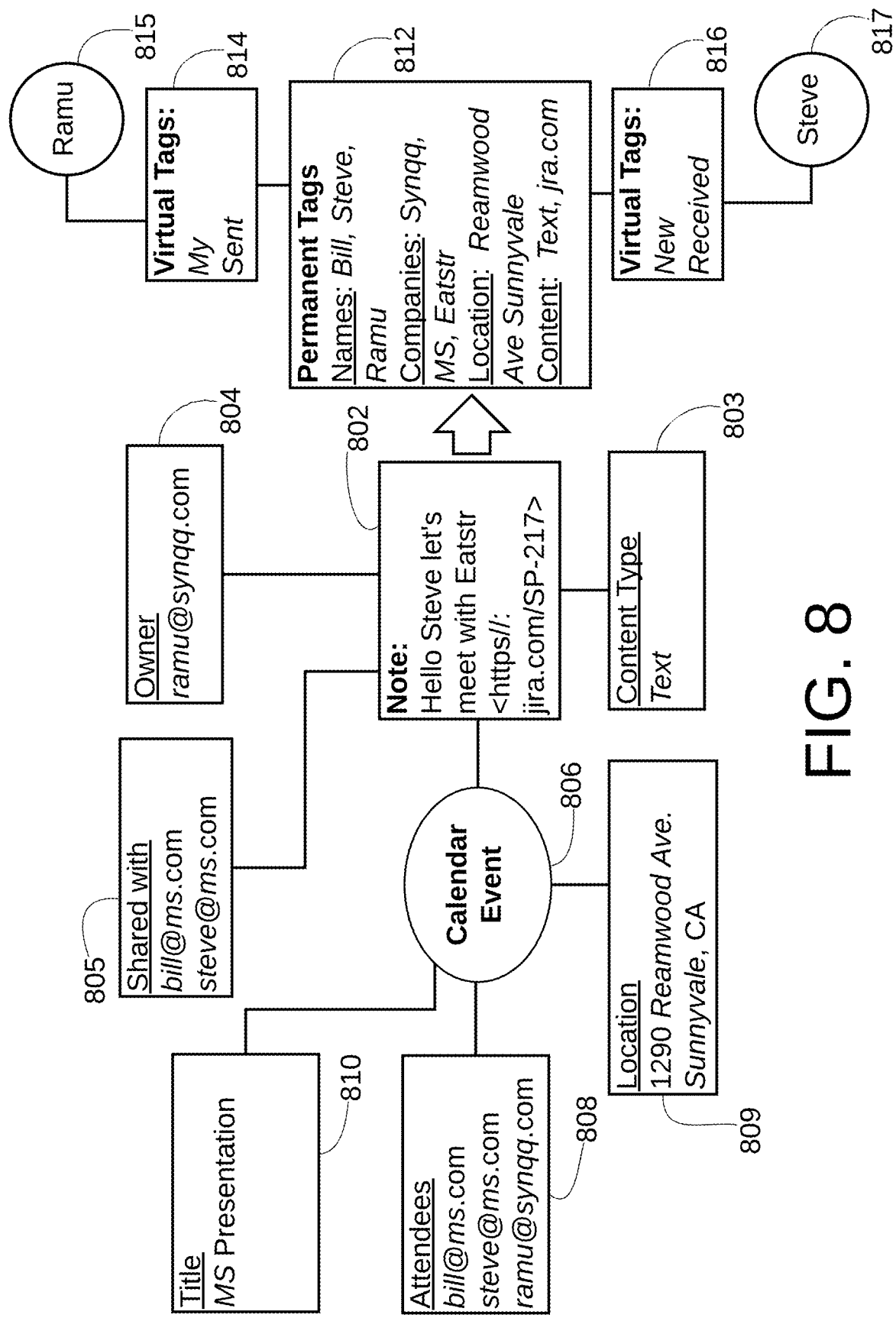
FIG. 8 is a diagram illustrating further details of generation of Smart Tags.

FIG. 8 is a diagram illustrating further details of generation of Smart Tags 115. In FIG. 8, a note 802 comprises a note of type text, 803, with a designation of an owner 804 and with whom the note is shared 805. The note 802 is associated with a calendar event 806, which has associated therewith, among other things, a plurality of attendees 808, a location 809, and title 810. The STS 100 responds to generation of the note 802 association with calendar event 806 by generating a plurality of permanent tags seen at 812. Three name tags are generated: Bill, who is seen at 805, 808; Steve, who is seen at 805, 808; Ramu, who is seen at 804, 808. Two company tags are generated: Synqq, seen at 804, 808; MS, seen at 805, 808, 810; Eatstr, seen at 802. One location tag is generated: Reamwood Ave Sunnyvale, seen at 809. Two content tags are generated to indicate the types of content: Text, jra.com. An example of two virtual tags that are generated by STS 100 are shown at 814 and 816 and are associated with two individuals, Ramu 815 and Steve 817. One or more virtual tags are generated for each user 114. For Ramu 815, two virtual tags 814, My and Sent are generated to indicate the status of the note 802 sent by Ramu, namely that the note 802 was Ramu's note and was sent. For Steve 817, two virtual tags, New and Received are generated to indicate the note is New and was received.

Figure 9:
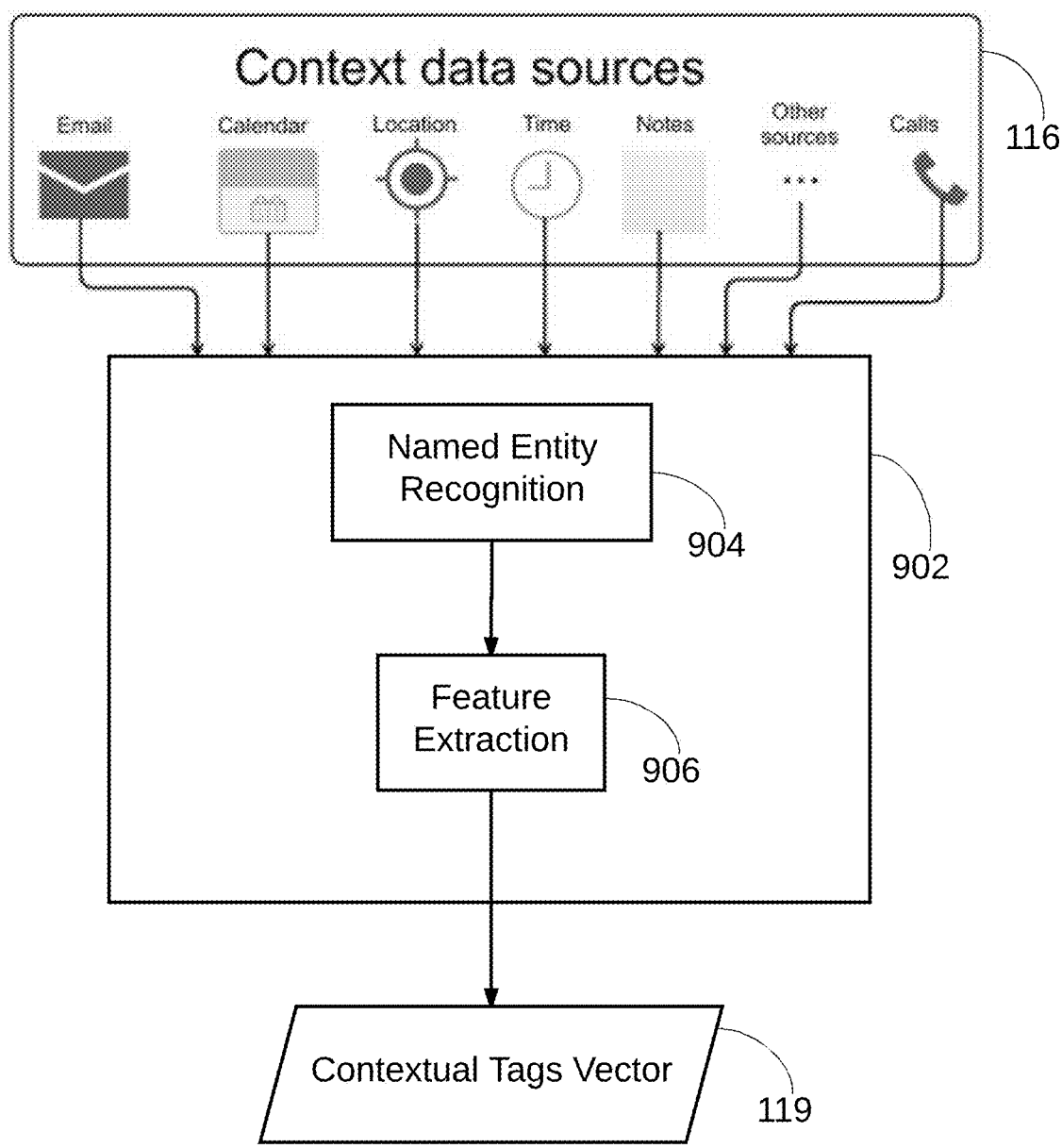
FIG. 9 is a flow diagram illustrating further details of operation of the User Context module of FIG. 1
Figure 10:
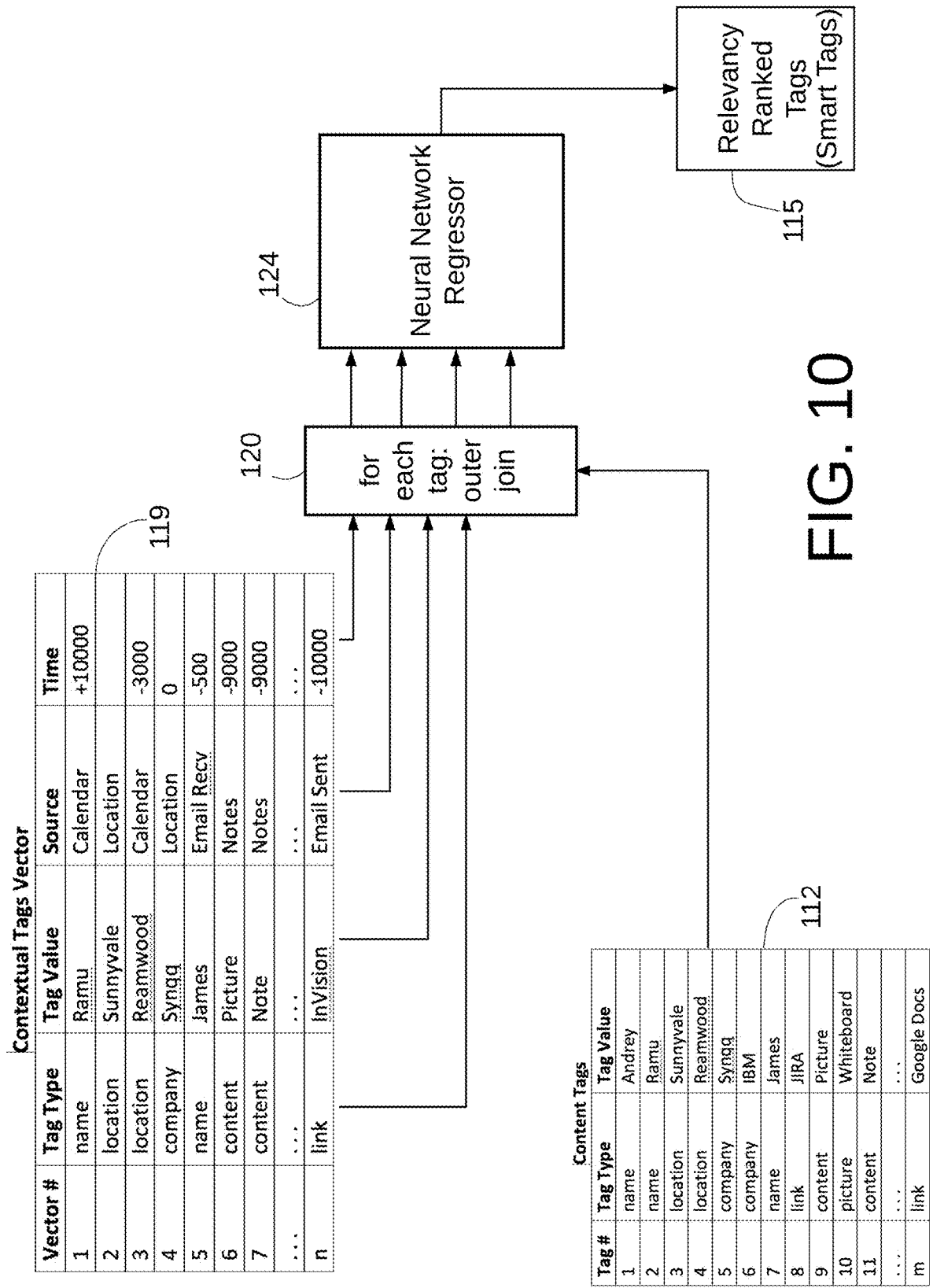
FIG. 10 is a flow diagram illustrating further details of the Context Embedding, Tag Generation and Tag Ranking modules of FIG. 1.

FIG. 9 is a flow diagram illustrating further details of operation of the User Context module of FIG. 1. The context data sources 116 are processed by module 902 to generate Contextual Tags Vector 119 which comprises a plurality of contextual tags as shown in FIG. 10. Named Entity Recognition (NER) module 904 operates to locate and classify named entities contained in information received from each context data source 116 into pre-defined categories such as the names of persons, organizations, locations, expressions of times, type of content. For example, in the text string "1290 Reamwood", the NER module 904 recognizes "Reamwood" and strips away the street number and stores only the word "Reamwood." Similarly, in the text string "call Bob Jones" the NER module 904 recognizes "Bob Jones" and strips away the word "call" and stores only the words "Bob Jones." Any one of a number of NER techniques, also sometimes referred to as entity identification, entity chunking and entity extraction including known techniques may be employed in implementations of NER module 904 to perform information extraction upon the incoming data. An example of software that provides NER is available from CRF implementation from Lingpipe with customized feature generation (Alias-I, Inc., 181 North 11th Str, #401, Brooklyn, N.Y. 11211 USA).

Preferably, Feature Extraction module 906 is employed to reduce the computational resources required to process larger sets of data such as increasingly occurs with the large amounts of data that can be generated by context data sources 116. As will be appreciated by those skilled in the art in view of the present disclosure, feature extraction involves reducing the amount of resources required to describe a large set of data by constructing combinations of the variables in the user context data 118 to reduce the number of variables while still describing the data with sufficient accuracy.

FIG. 10 is a flow diagram illustrating further details of Context Embedding and Tag Ranking of FIG. 1. Context Embedding module 120 receives contextual tags vector 119 and stored tags 112. Each row in the contextual tags vector 119 has a Tag Type column that specifies a type of tag, such as for example: name, location, company, content, link. Each row also has a Tag Value, to indicate a value for the tag type, a Source, to indicate source of the information. Each row in the contextual tags vector 119 has a time dimension in the last column. This value is computed relative to the current time. Times in the future have a positive value, the current time has a value zero and times in the past have a negative value. The time values shown at 119 are in seconds but other units of time may be used. These are not tags related to any piece of content but only for the context.

Details of content tags are also shown in FIG. 10. A content tag corresponds to a row in Content Tags table 112, where each row includes a tag number to uniquely identify the tag, a tag type to indicate the type of data represented by the tag, such as name, location, company, link, content, picture, and a value associated with the tag type.

Context Embedding module 120 performs an operation in the nature of an outer join on the received contextual tags vector 119 and the tags 112. As will be appreciated by those skilled in the art, the outer join operation results in a union of the received data, i.e. the union of the contextual tags vector 119 and the tags 112, which generates an association between tags 112 and the contextual tags vector 119. If any row in either 119 or 112 does not have a correspondence in the other data set the missing data element is set to null.

The result set is sent to Tag Ranking module 124 which implements a Neural Network (NN) Regressor to generate a relevance value between '0' and '1' for each content tag. The Relevance value for each of the tags is a value between '0' and '1'. The NN is preferably initially pre-trained. This pre-trained model for NN is the starting model for all new users 114. It is further augmented for each user 114 based on their interactions with the application 126 as it operates with the STS 100. For example, if the user 114 has clicked on a SmartTag that is in 5th place and then the NN Regressor has reinforced learning to interpret that the tag in 5th place is more relevant to the current context. The NN is continuously learning from each of the user interactions.

The NN Regressor may employ any one of a variety of techniques including known neural network regression techniques, such as, for example, DEEPLEARNINGFORJ an open-source, distributed deep-learning project in Java and Scala with customized feature generation available from Skymind, San Francisco, Calif. (https://deeplearning4j.org/linear-regression). As will be appreciated by those skilled in the art in view of the present disclosure, neural networks are useful in unsupervised learning, classification or regression by operating to group unlabeled data, categorize that data or predict continuous values after supervised training. The output of NN Regressor 124 are the Smart Tags 115 which represent an ordered listing of tags, where each tag has associated therewith a value indicative of likelihood of relevance to the user 114 such as where the value "1" indicates highest likelihood and the value "0" indicates lowest likelihood. An NN regressor is an example of a simple multilayer NN. In general, regression in accordance with the principles herein can be implemented using any deep learning framework.

Speech to Text Accuracy. Synqq Voice Assistant improves the accuracy of speech-to-text conversions by using Smart-Tags generated for each user. Synqq fragments the voice into sentences and sends it to The Automatic Speech Recognition (ASR) products either from cloud vendors/open source to convert to text segments with different probabilities. For example, if the user had interactions with a company called "GoFundMe", then the ASR service returns results as three words "Go", "Fund" and "Me", Synqq ML combines them into one entity "GoFundMe" based on the list of smartags the user. Synqq also aggregates the SmartTags for different roles in a domain and across the Enterprise use of the voice assistant. For example, if new users in the same domain, Synqq Voice Assistant will use the corpus of SmartTags to improve the speech-to-text accuracy.

Priors. https://en.wikipedia.org/wiki/Prior_probability. In any Machine Learning system, the probability of text words is improved in case of Synqq with the STS. This is further extended to different roles in the enterprise. For every new user, Synqq STS system computes the priors' probabilities without compromising the privacy of the individuals. Each user, the SmartTag data is private and only used for that user. However this data set of SmartTags is aggregated across users to build the lingua franca for a given role in a given domain. This data set is used to build the better probabilities of "priors" for all users in a given domain.

Recommendations. Synqq pro-actively offer predictions of what the user might say. This technique is used to predict entries for form filling using voice in the enterprise. Synqq learns from the users prior data sets completed and suggests the possible recommendations to the user. For example, if the user had a meeting with "Phil Aucett" at a certain location in Burlingame, Calif., then next time the user tries to create a meeting with "Phil Aucett" then the service suggests the "Burlingame, Calif." location so the user just have to say "yes" and the Synqq Voice Assistant will create the meeting with that location details.

Dialogue Context. Maintain the current dialogue context to determine the intent of the users request. For example if you ask Synqq Voice Assistant "What are my meetings for today?" then as Synqq gives the user TTS response, the user can then get more details of the "IBM Meeting" you have today and get to the list of participants in that meeting and when you met last with them, etc. Synqq understand where you are in the conversation and automatically determines the new intent that you are referring to the "IBM Meeting" today and gives out more details of that meeting.

Interrupts. All of the Voice Assistants in the market are based on Request-Response. In other words, if you ask Amazon Alexa a question, you have to wait for the "TTS" or text-to-speech response to complete or interrupt it by saying "Ok Alexa". Unlike these products, Synqq TTS responses can be interrupted by the user to have a natural dialogue. For example, if ask Synqq Voice Assistant "What are my meetings today" and as the TTS responses come back, you can interrupt it and ask normally "how about tomorrow" even before it completes giving the response. This way it listens to the user, reclassifies the intent and returns the new TTS response for the your events tomorrow.

Figure 11:
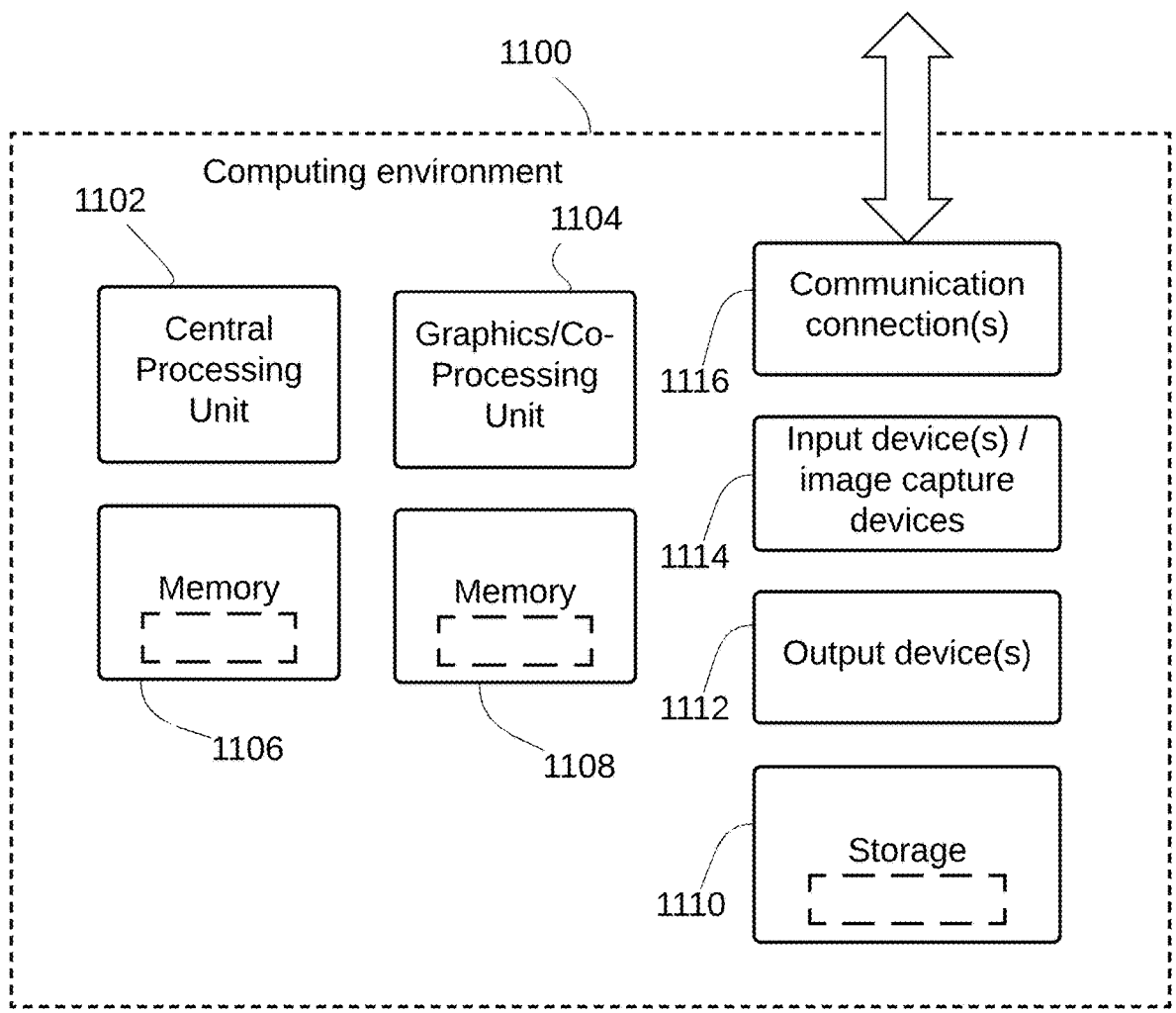
FIG. 11 illustrates a block diagram of a hardware that may be employed in certain embodiments.

FIG. 11 illustrates a block diagram of a hardware that may be employed in an implementation of the STS 100, and other computerized devices that may be employed, and preferably to improve the processing speed and efficiency with which the computing system 1100 implements the STS 100. With reference to FIG. 11, the computing system 1100 includes one or more processing units 1102, 1104 and memory 1106, 1108. The processing units 1102, 1104 execute computer-executable instructions. A processing unit can be a general-purpose central processing unit (CPU), processor in an application-specific integrated circuit (ASIC) or any other type of processor. The tangible memory 1106, 1108 may be volatile memory (e.g., registers, cache, RAM), non-volatile memory (e.g., ROM, EEPROM, flash memory, etc.), or some combination of the two, accessible by the processing unit(s). The hardware components in FIG. 11 may be standard hardware components, or alternatively, some embodiments may employ specialized hardware components to further increase the operating efficiency and speed with which the STS 100 operates.

Computing system 1100 may have additional features such as for example, storage 1110, one or more input devices 1114, one or more output devices 1112, and one or more communication connections 1116. An interconnection mechanism (not shown) such as a bus, controller, or network interconnects the components of the computing system 1100. Typically, operating system software (not shown) provides an operating system for other software executing in the computing system 1100, and coordinates activities of the components of the computing system 1100.

The tangible storage 1110 may be removable or non-removable, and includes magnetic disks, magnetic tapes or cassettes, CD-ROMs, DVDs, or any other medium which can be used to store information in a non-transitory way and which can be accessed within the computing system 1100. The storage 1110 stores instructions for the software implementing one or more innovations described herein.

The input device(s) 1114 may be a touch input device such as a keyboard, mouse, pen, or trackball, a voice input device, a scanning device, or another device that provides input to the computing system 1100. For video encoding, the input device(s) 1114 may be a camera, video card, TV tuner card, or similar device that accepts video input in analog or digital form, or a CD-ROM or CD-RW that reads video samples into the computing system 1100. The output device(s) 1112 may be a display, printer, speaker, CD-writer, or another device that provides output from the computing system 1100.

The communication connection(s) 1116 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

Voice Inputs

The methods and systems disclosed herein facilitate data entry into a computerized device by permitting entry of data and commands by voice. Entry of voice inputs is preferably initiated via a single physical button on the phone, thereby permitting single hand usage. In other embodiments, voice input can be provided via headphones, either wired or wireless, and voice entry can be initiated by way of a button on the headset. In other embodiments, voice entry can be initiated via a control on another device, such as a button on a steering wheel in a car that is linked to the mobile phone by a wired or wireless connection.

The disclosed methods and systems employ a form of Artificial Intelligence (AI) enabled Voice Assistant to improve voice input to computer devices. Machine Learning (ML) technologies, part of AI, understand spoken words more precisely, based on a user's past interactions and context within an application, such as which screen is active in an application being used by the user.

The disclosed methods and systems select grammar of spoken words as a function of context within the application being used by the user to improve understanding of spoken words.

The disclosed methods and systems can transform products like Yelp, and all the mobile apps, on a user's mobile phone to allow the user to provide an intuitive, simple spoken natural language command such as "open restaurants and find Sweet Tomatoes". The user touches the volume button and says the above and the system performs the appropriate speech to text conversion and associated processing and shows the nearby Sweet Tomatoes on the user's mobile phone. In contrast, in an iPhone, Siri is the voice assistant for the phone and has no context. Generally, the disclosed voice assistant enables form filling in any application with voice.

Overall capabilities of the disclosed voice assistant system are described in the below description. The system described may in certain embodiments employ capabilities of the underlying engine of the system described in patent application Ser. No. 15/686,031, filed on Aug. 24, 2017, entitled "Computerized Method and System for Automatically Tagging Interactions and Providing Contextualized Information, which is hereby incorporated by reference in its entirety, and extends that engine to provide contextualized information in response to voice commands. The system described below may also employ techniques disclosed in the following patent applications which are each hereby incorporated by reference in their entirety: Ser. No. 14/709,137, filed on May 11, 2015, entitled "Method and System for Real-Time Data Updates"; and Ser. No. 14/977,567, filed on Dec. 21, 2015, entitled "Computerized System and Method for Capturing and Contextually Retrieving Interactions and Generating an Interaction Graph.

The disclosed systems and methods provide a highly practical use of voice as a primary interface for business applications. They also show that sophisticated earphone/microphone devices such as Apple AirPods are valuable for everyday work.

The disclosed Machine Learning (ML) model operates to organize, share, and retrieve information that is critical to professional interactions. The ML models learn from each users interactions and enables easy, and efficient use of voice that would otherwise be impossible. Each of these functions is more appealing when used with Apple's new AirPods or any other headset or just speaking to your phone:

Voice Commands

Voice Commands offer more than the simple hands-free operation of your smartphone or browser. You can invoke functions like "open timeline", "open notes", "add a note," "share a note," "create a new event," or "create a meeting." You can also ask for the details of your interaction history with any individual in your Synqq Business Network, "find Sanjay Prasad". Synqq understands all of these commands and based on your past interactions, develops an increased "understanding" of your intent with every use.

Form-Filling

Synqq's Machine Learning (ML) model learns from your interactions and predicts with a high degree of accuracy of the names, entities, locations, etc. to respond to commands, fill forms with the right content and to make recommendations for names and other details, locations, etc. For example, after your current meeting, if you need to have a follow-on meeting just issues the command: "create a follow on meeting with Ramu, James and Michael tomorrow at 10:00 AM for an hour". Set the title to "Patent follow up." Synqq's Machine Learning (ML) understands the names of the people, and picks up the other pertinent facts required to set up a new meeting and then automatically creates the calendar invite; just like you would expect an intelligent assistant to do.

Recording voice notes is not new, but Synqq with or without Apple AirPods, offer a whole new level of personal productivity, in a compelling form. One tap enables recording of voice as usual with iPhone or browser. Synqq then responds to voice commands to share with others, recall and playback on demand. Synqq "take voice note stop the voice note and share"—this makes the voice note recording and stream to the cloud and automatically shared with the users.

Synqq Voice Assistant is a new technology that simplifies User Interaction with applications on mobile devices by means of voice.

Figure 24:
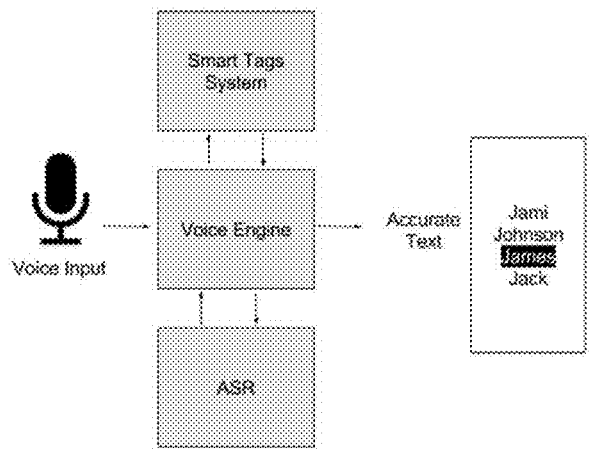
FIG. 24 illustrates usage of smart-tags to improve operation of a disclosed voice assistant.

Synqq builds the relevant smart-tags for each user based on their daily interactions with people, location, titles, and other content. This well annotated data set is used by Synqq to improve the accuracy of the results from the Automatic Speech Recognition (ASR) service for each user. For example, if a user met recently with "James Shelburne" based on the set of smart-tags, then even though the ASR output of text is "Jami", "Johnson", "Jack" or "James" with varying probabilities, then Synqq as shown in FIG. 24 will recommend the recognized text as "James" even though the ASR has ranked it low in probability.

Synqq aggregates the set of Smart-tags for all users in an enterprise or a domain. This data set is used to improve the accuracy from the ASR outputs for all user interactions. For example, if a user met with a company called "GoFundMe", which has become a smart-tag for that user. Then, if the ASR outputs are close to the three words "go", "fund" and "me", with each in succession, then Synqq recommends "GoFundMe" with a higher confidence as the recognized text. And for other users in the same domain, even those who have not had interactions with the company "GoFundMe", Synqq AI recommends "GoFundMe" with a higher degree of confidence based on the learning's it has had from all users within that domain.

Prior probability distribution of a random variable. Allows us to dramatically improve accuracy of the machine learning algorithms. Smart Tags gives us a higher probability. In every enterprise, Synqq builds the lingua-franca for the enterprise and maintains the corpus of data with recency information to improve recommendation accuracy and relevancy. For example, in the case when Synqq Voice Assistant is used by Field Service Technicians in a company and it learns that technicians are ordering "XDSL" over the "ADSL" equipment for their customers. When a new Field Service technician starts using the Synqq Voice Assistant, then this new user gets the most appropriate recommendations based on existing user's usage of Synqq. When new field service technicians try to order equipment using voice, then Synqq recommends "XDSL" first in the list of possible items to procure.

Figure 25:
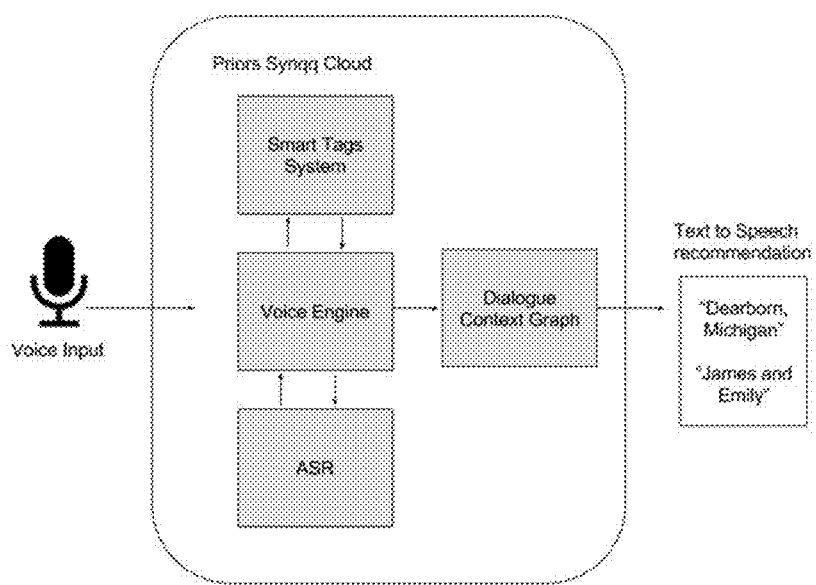
FIG. 25 illustrates recommendations by a disclosed voice assistant.

"Recommendations" what the user sees or hears from the Voice Assistant. It makes the system proactive to work on your behalf. Synqq uses the list of Smart-tags to provide relevant recommendations for each user to complete forms using voice. For example, if the user is creating a meeting with the title "Ford Status Meeting", and prior meetings with this title were created at location "Dearborn, Michigan" with "James and Emily", then Synqq recommends the location as "Dearborn, Michigan" as seen in FIG. 25. The user can override recommendations. Synqq makes the recommendations in the meeting creation process using earlier values so the user can complete the forms without having to input all form fields manually.

Synqq continuously updates the list of Smart Tags maintained for each user based on their usage of the Voice Assistant mobile and web applications. The set of Smart Tags have recency and frequency information to be used by Synqq to improve the results of the Voice Assistant.

Synqq has developed a semantic engine (part of the Natural Language Understanding—NLU) to improve the determination of "intents" for user commands. For example, Synqq interprets the words "find", "get", "what all", etc. as intents for "Search" of a given data set. The Semantic Engine uses word-vector to determine the most likely intent. Context in the application augments this. For example, the commands "create a meeting", "schedule a meeting", "would like to meet" all refer to the same intent to "create a meeting", and drop the user into the "create event" process. Unlike the current request response experiences from Apple, Alexa, and Cortana, Synqq Voice Assistant provides a true conversational experience. We maintain a graph of the current dialogue context and use it for intent. Synqq NLU engine maintains the dialogue context graph that uses all previous voice requests and given responses. Each new input from the user is classified by this history. Synqq uses this graph for ambiguity resolution, and co-reference resolution. For example, when someone says "Who did I meet last week?", and Synqq gives a response, the user can follow up with "Only from Microsoft", and the system will reclassify the intent of the user based on the previous search as "Show people from Microsoft who I met last week." This can then be followed up with "Show emails from him", which gives further reclassifies the intent as "Show emails from John at Microsoft who I met last week."

Interruption detection and intent reclassification. We use ASR and an interruption detection system so that when we see the user interrupting the system we stop the output, and listen for new voice commands that would change the previous intent. For example, when you use Alexa/Siri/Cortana, you have to wait until the response is completed or stop the response entirely, which causes the system to lose the previous intent. For example, when you ask one of these systems "What's the weather like tomorrow?" The user has to wait until the response is completed to ask another question, or tell it to stop. Unlike these systems, when Synqq Voice Assistant is asked "What's the weather like tomorrow?", and gives a response (based on the current location), the user can interrupt in the middle of the voice output and say "No in San Francisco", and the ASR will see you interrupted it and redefine your intent as San Francisco instead of current location. ASR enables us to interrupt output and quickly redefine the intent. This is feasible in view of the foregoing description. We also correct the state of the dialogue quickly and can perform total reclassification of intent. For example, if the user says "What's the weather like?" The user can then interrupt the Synqq Voice Assistant while it's giving a response and say "What's my day look like?" Synqq will reclassify the intent after interruption from finding the local weather to searching the user's calendar.

Details of Certain Embodiments

User Interface

This section describes Synqq Voice Assistant from User Interface and User Experience point of view and how it is different from competitor's solutions.

In this section we will use implementation of the approach in Synqq application for Apple iPhone as an example. Those skilled in the art will understand in view of the present disclosure that the embodiments described herein may be deployed on other platforms such as Android, Windows, etc.

Main Elements

Synqq Voice Assistant User Interface comprise the following elements: Activation button (FIG. 12)

Figure 12:
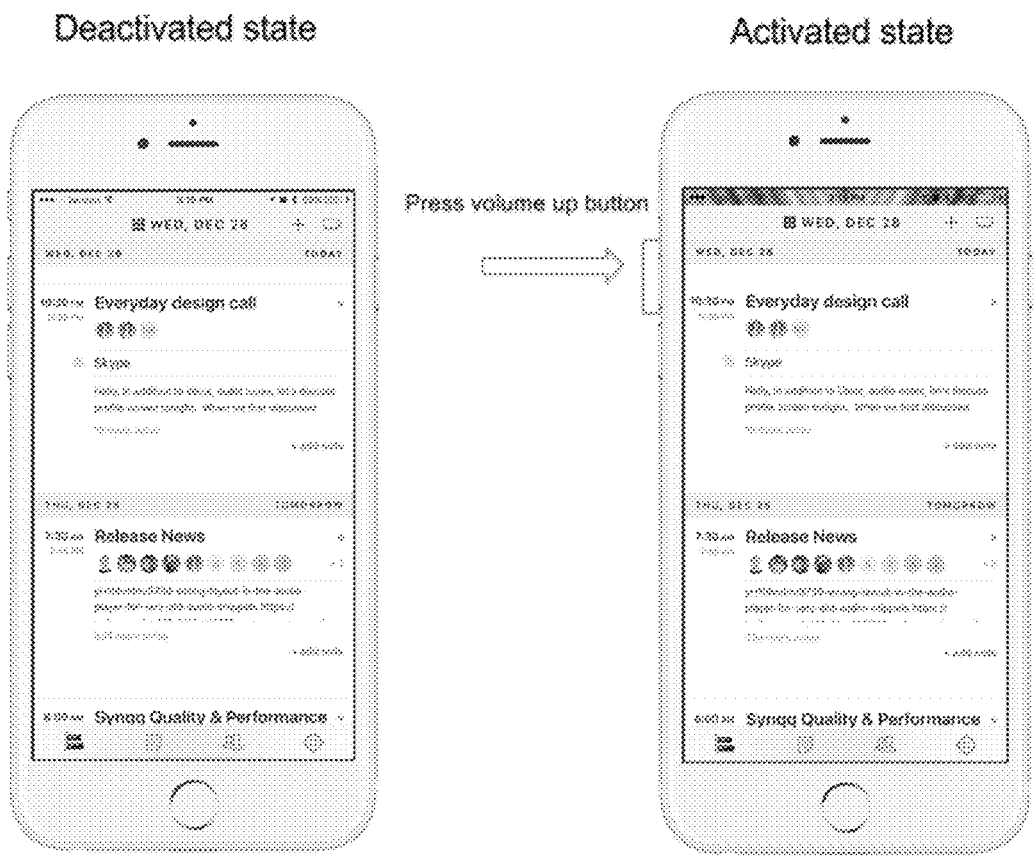
FIG. 12 illustrates activation of voice assistant on a mobile device.
Figure 13:
FIG. 13 illustrates various embodiments of headsets.

To activate Synqq Voice Assistant on any screen inside of the application, as shown in FIG. 12 we use hardware volume up button on iPhone and wired headsets, such as standard Apple headset, or play pause button on wireless headsets such as Apple AirPods. The same button can be used to deactivate voice assistant. Synqq Voice Assistant can also be activated by saying 'synqq' or having an explicit microphone icon on the application screens Two embodiments of the headsets with microphones and earphones can be seen in FIG. 13.

Figure 14:
FIG. 14 illustrates a voice activity and status indicator.

Voice Activity and Status Indicator (FIG. 14)

We use iPhone status bar on all screens of the application to in indicate that: Synqq Voice Assistant is active, microphone is capturing some sound, and a command has recognized.

Figure 15:
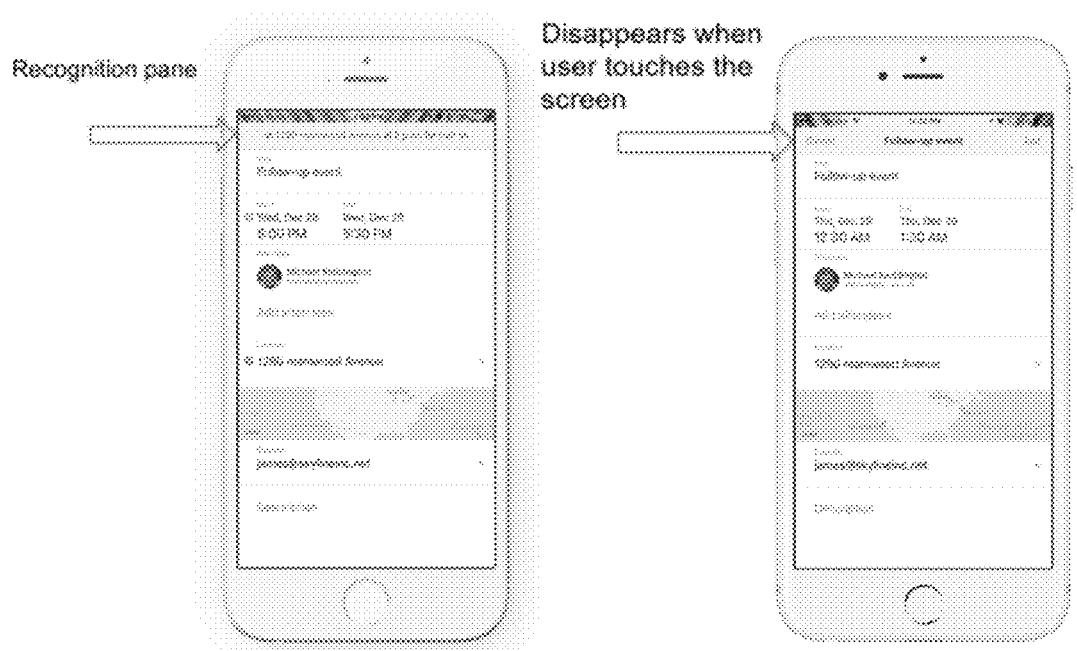
FIG. 15 illustrates a recognition pane.

Recognition Pane (FIG. 15)

Small semi-transparent pane under status bar appears to show intermediate results of speech recognition and recognized commands. This pane disappears when user touches the screen.

User Stories

This section will demonstrate Synqq voice in two use cases: retrieval and input of information.

Figure 16:
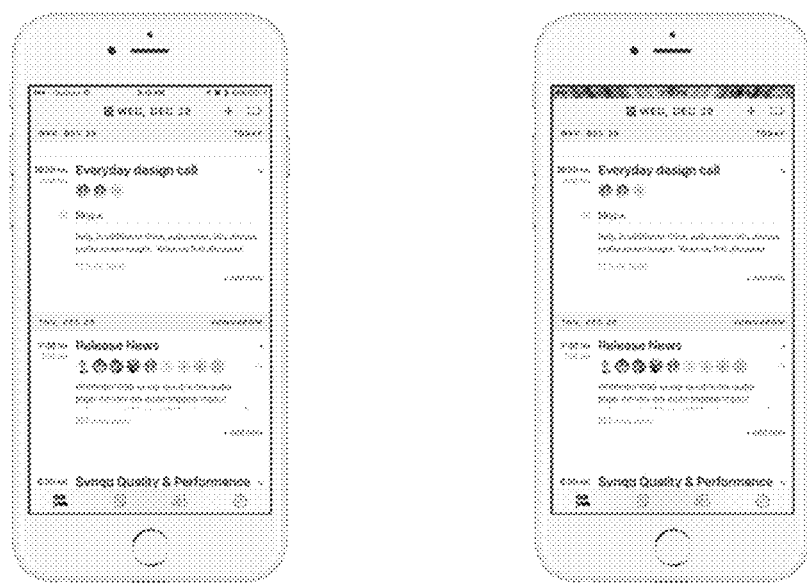
FIG. 16 illustrates activation of a search event.
Figure 17:
FIG. 17 illustrates voice entry of a search query.
Figure 18:
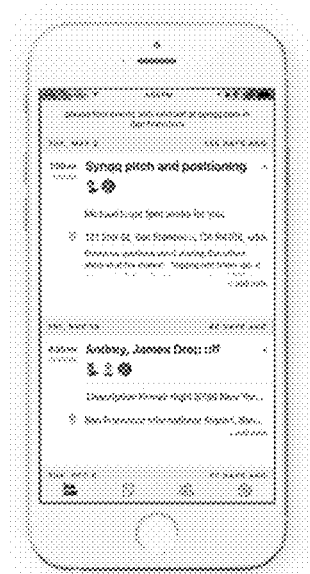
FIG. 18 illustrates display of results of the search query of FIG. 17.
Figure 19:
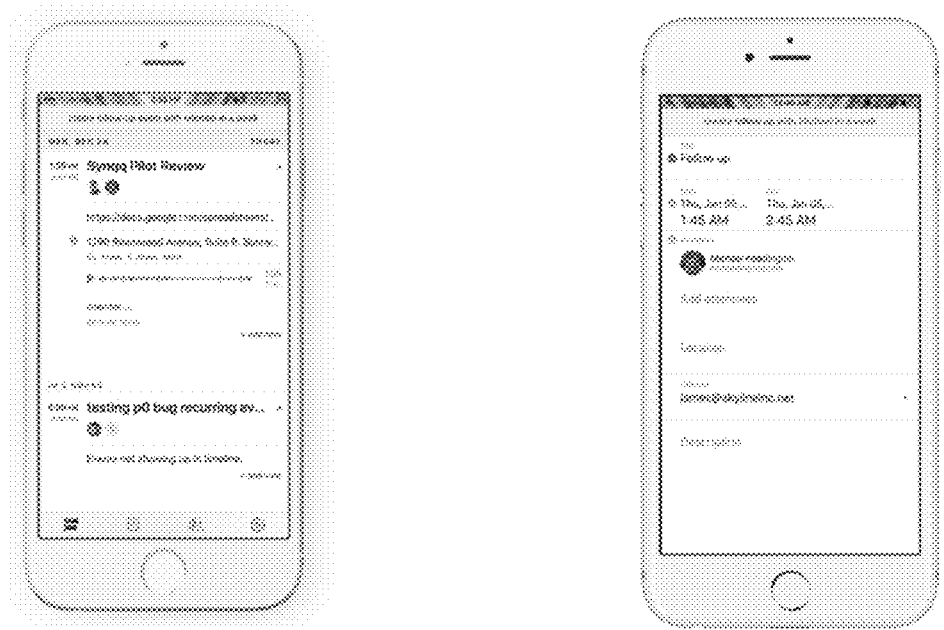
FIG. 19 illustrates a fill event creation form.
Figure 20:
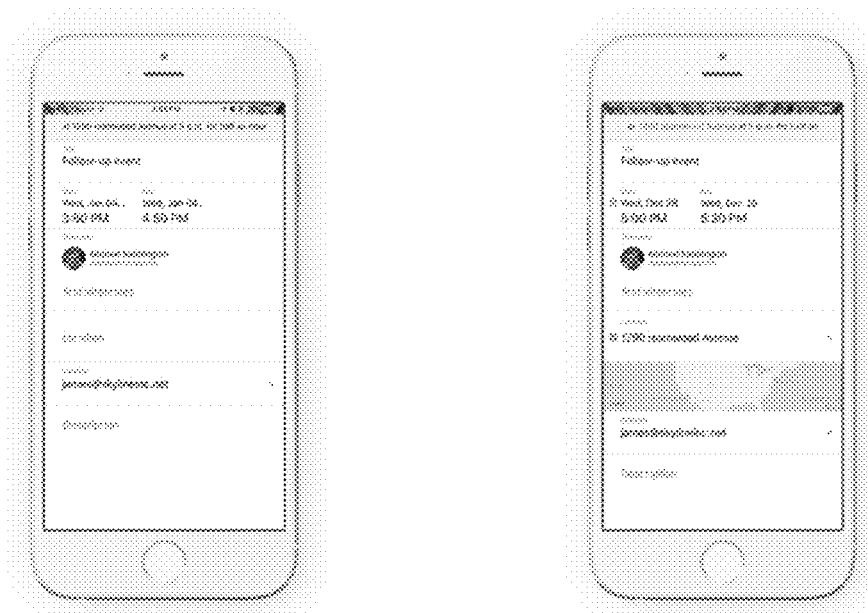
FIGS. 20, 21, 22 illustrate various voice entries for a calendar entry.
Figure 21:
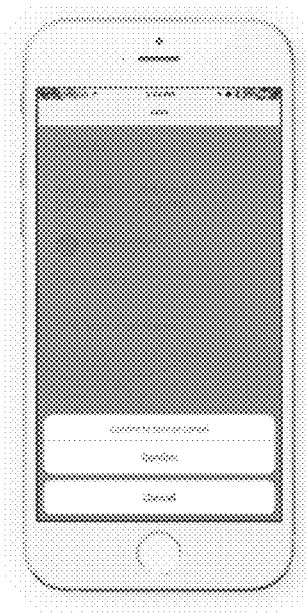
Figure 22:
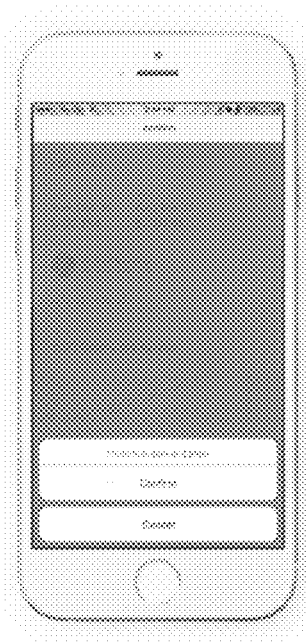

Search Events
1. Activate (FIG. 16)
2. User says 'please find events with Michael at synqq.com in San Francisco' (FIG. 17)
3. User sees the result of the command (FIG. 18)
Fill event creation form (FIG. 19)
1. Activate (same as in Search events)
2. User says 'create a followup event with Michael in a week'
3. User says 'at 1290 Reamwood Avenue at 5 p.m. for half an hour' (FIG. 20)
4. User says 'save' (FIG. 21)
5. User says 'confirm' (FIG. 22)

Advantages of the Approach

Synqq Voice Assistant is activated using hardware buttons which makes it available on all screens in the application. We don't need application to be redesigned to support software button for activation. We use standard iPhone status bar as voice activity and status change indicator, which is also available on all screens of the application and does not require additional real-estate or design changes.

Grammar of the language understood but the system is contextually dependent on where user is in User Interface. For example, if the user is on the homepage of the application and says 'in 5 minutes' the system will ignore this command and do nothing. Whereas if on event editing page 'in 5 minutes' will change start time of the event. Combination of visual representation of elements on the screen with voice assistant makes user experience uniquely easy and intuitive. User needs a fraction of second to visually comprehend what is possible on each screen of the application and what voice commands can be applied. User can also interleave voice commands with traditionally finger tap interface.

In most cases voice assistant in combination with contextual predictions makes is much easier to input complex data such as dates, time, emails, addresses and etc. For example: User may say 'next Friday at noon' instead of finding appropriate Date using traditional date picker doing calculation what day is next friday in mind. Another example: user says 'invite andrey at synqq' system is smart enough to figure out that there is only one Andrey working at synqq, his email is ryabov.andrey@synqq.com and user wants to and him as an attendee to the event. Note that traditional autocomplete keyboard would not work here because email ryabov.andrey@synqq.com starts with 'r' not 'a' and there could be other users with name andrey but not working at synqq which would be preferred by autosuggest.

| Comparison with existing solutions | | | |
|---|---|---|---|
| | Synqq | Siri | Google |
| Activation | In the application press Volume Up or Play/Pause on headset or say 'synqq'. | Long press on iPhone Home button or say 'hey siri' or tap on AirPods. | Always on by default in the App. Activated anytime by saying "ok google" |
| Deactivation | Press the Volume Up or Play/Pause | Press Home button | |
| Scope | Inside the application only. | Globally, outside of any applications. | Inside the Google application. |
| Context | Each screen of the app has it's different set of supported commands depending on content of the screen, control elements and etc. | Works outside of apps therefore holds no context except commands previously entered by user. | No context, used only for search. |
| Combination with Graphical User Interface | Introduces only one new visual element recognition pane which disappears when user touches the screen. Except that reuses existing visual elements - status bar, and hardware buttons. Use of voice can be interleaved with use of traditional touch screen interface. | Create whole now GUI which covers and blocks all other UI elements on the screen. Can't be interleaved with traditional touch GUI elements. | Create whole new GUI which is specific for google search with listening/ recognition element which takes all the screen and blocks all other elements. Uses software activation button which is in different places on different screens. |
| Extendability | Because of unintrusive model can be used in most of iPhone applications. Can support contextually dependent commands for each screen. | Very intrusive UI. Can't be used inside of applications. Extend only by adding siri skills which open application passing parameters. | Very intrusive UI designed specifically for search purpose; can't be used in general case. |

Universal Applicability

Synqq Voice Assistant has unique properties that allow it be used in all types of mobile applications that have non-trivial input elements. None of competing approaches is so widely applicable. For example, here is how Synqq Voice Assistant could be used with Yelp mobile application:
User opens Yelp and pressed the volume button to activate voice assistant,
User says 'category food'—app opens search screen with Food tag selected,
User says 'open map'—app shows map,
User says 'open now'—app filters out closed places,
User says 'show Bourbon Steak'—app opens appropriate place.

Users can combine more than one command in free from sentence: 'show on map food places that are open now'.

Technology

Figure 23:
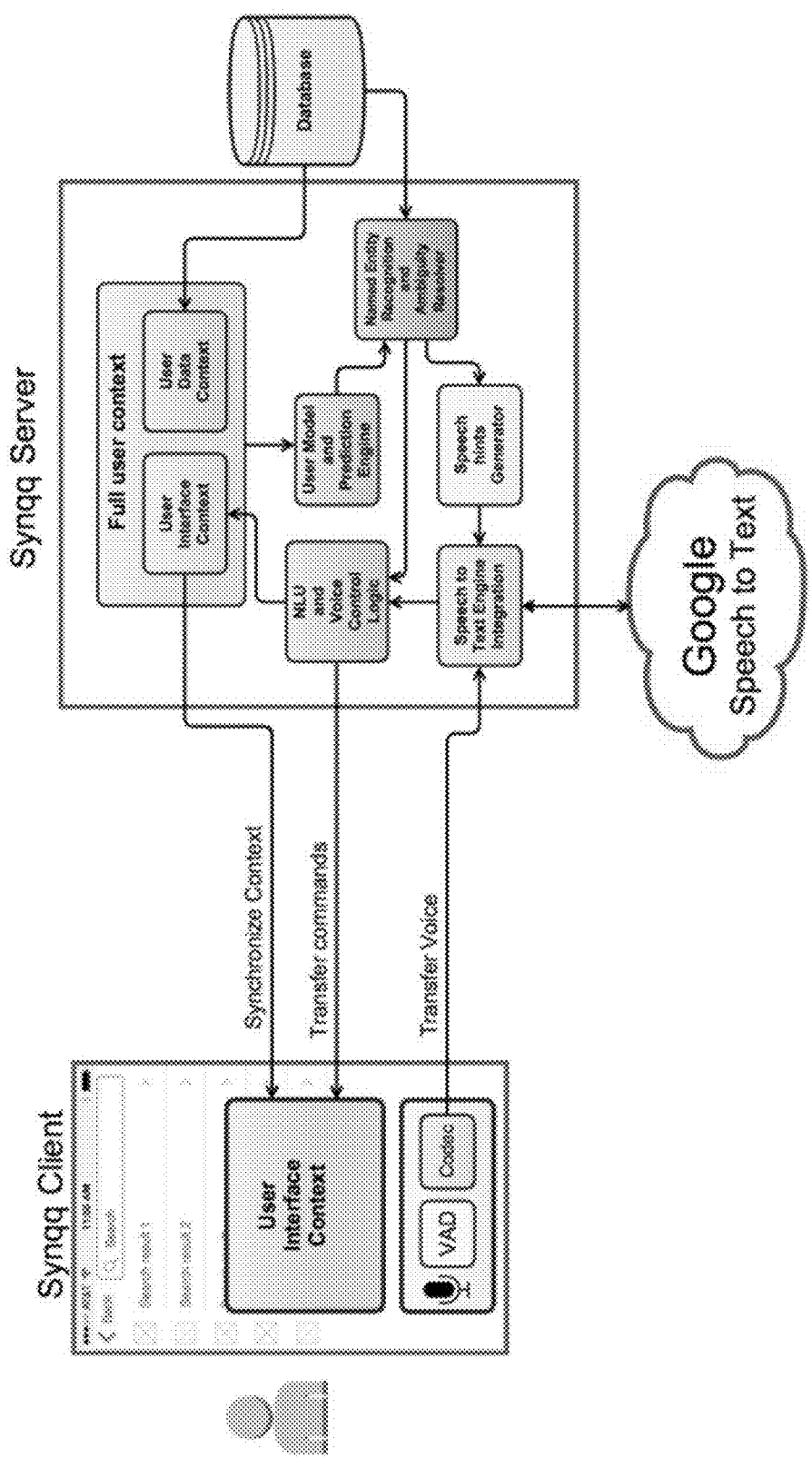
FIG. 23 is a high level block diagram of an embodiment of a voice assistant client and server architecture.

This section describes the technology behind Synqq Voice Assistant, details of implementation and comparison with competing technologies. FIG. 23 shows main elements of Synqq Voice Assistant client and server architecture. Arrows show directions of data and commands flow between components.

Synqq Client

Synqq client is a regular iOS application augmented with Synqq Voice Assistant User Interface elements. The application captures speech from microphone filters voice from noise, encodes and transfers to the server. User Interface Context is a state of the application user interface including what page user is on, values of input component and etc. Synqq monitors all user activities in the application and syncs the state with the server. Client receives commands from the server from and modifies UI state accordingly.

Synqq Server

Synqq servers receive encoded voice and transfer it to the Google Speech to Text (Automatic Speech Recognition—ASR) cloud service in a streaming mode. Recognized text is sent to a Natural Language Understanding and Voice Assistant module where it's transformed to commands which are send back to the client.

The following sections describe some critical elements in greater details.

User Interface Context

Each screen or state of a screen has its own unique context values for input elements that may also be part of context. Context defines possible voice commands that user may say and possible commands sent from the server. User Interface Context is constantly synchronized with the server to update the voice recognizer state. The server may send commands to change UI elements states in response to certain inputs from the user.

User Data Context

Each user has their own relevant dataset of Smart Tags. Such as contacts list, set of recently received emails, recent and upcoming calendar events, current geographic location, other people at the same geographic location, etc.

Predictive Model.

The User Model and Prediction Engine is a piece of software which uses Machine Learning (ML) techniques to build a model that can predict possible user input and behavior. We use vector space model, k-NN and similar algorithms to predict different parameters of Name Entity Recognizer such as Speech-to-Text recognizer hints, Ambiguity Resolution and other subsystems based on current Full User Context. Full User Context is User Interface and User Data contexts combined. The predictive model initializes Speech-to-text hints to limited subset of all possible words that the user may have used in the current context, which significantly improves the quality of speech recognition. For example: User says: 'create weekend hike with James and Ron at aol at rancho on Saturday at 9 a.m.'

Synqq will recognize 'weekend hike' as a title of the event, James' and Ron at aol' as attendees, 'rancho' as location, 'Saturday' as date of the event and '9 a.m.' as event time. System will run this date against vector space model and build a net of similar events.

System will resolve James to <james@synqq.com> because is the closest connection to other people who user had been on hike with. Named Entity Recognizer will understand that AOL is a company. This will give a hint to resolve Ron to <rhoward@corp.aol.com> as it's the only contact with name Ron at AOL. Based on current user geolocation and other hikes in the users's events history the system will resolve 'rancho' to Rancho San Antonio Preserve.

Natural Language Understanding

We use the Fuzzy Formal Language Parsing techniques to parse out meaningful text structures. Fuzzy grammar definitions allow free form speech to be reasonably accurate.

Each User Interface Context has it's own grammar definition that create impression of a dialog. For example: On time home screen of the app users says: 'in 5 minutes' the system ignores this phrase because it has no meaning on timeline and no such rule in home screen grammar. Then user says 'create event in 5 minutes'. System finds appropriate rule in home screen grammar that handles 'create event', system changes user interface context to event creation screen where it finds grammar rule that parses 'in 5 minutes' this string is converted to set start time command.

Another advantage of using of formal grammars is speech-to-text recognition result validation which significantly improves quality of speech recognition. For example: User want's to add attendee with name Ramu and says: 'add ramu'.

Speech-to-text recognizer will return several alternatives like: 'add remove', 'at remote', 'add ramu', . . . first two alternatives will be discarded because they are grammatically incorrect in current context.

Key differentiators of Synqq Voice Assistant technology are:

Extensive use of predictive model based on User Data of Smart Tags and User Interface Context. This model predict with high accuracy what user may say in particular context, generate appropriate hints for speech-to-text engine, and resolves ambiguities. It improves the accuracy of Speech-to-Text from any Automatic Speech Recognition (ASR) engine by using the data of Smart Tags, Roles and cumulative learning of Smart Tags from all users in a given domain.

The use of Context-Dependent Fuzzy Formal Grammar, which allows parsing of very complex grammatical constructs of Human language, significantly improves speech recognition quality by selecting contextually correct and grammatically correct meaningful alternatives from amongst possible results of recognition.

While the invention has been described in connection with a preferred embodiment, it is not intended to limit the scope of the invention to the particular form set forth. Rather it is intended to cover such alternatives, modifications, and equivalents as may be within the spirit and scope of the invention as defined by the appended claims.

What is claimed is:

1. A mobile device comprising:
   a plurality of physical buttons for providing programmable control inputs to the mobile device; and
   a processor programmed with instructions to cause the mobile device to:
      respond to a first input by a user via at least a first of the plurality of physical buttons by activating voice recognition by the mobile device and providing via a visual status bar provided by an operating system of the mobile device, an indication of voice recognition activation;
      accept voice inputs to the mobile device;
      provide data representative of the voice inputs to a server;

provide user context information to the server, wherein the user context information comprises geographic location of the user;

receive from the server, application commands to permit the user to navigate within an application executing on the mobile device by way of the user's voice inputs, wherein each screen displayed by the application has associated therewith one or more application commands to which the application responds, wherein the application commands are generated by the server as a function of the user's voice inputs, the user context information, and the application commands contained in a screen currently displayed by the application to the user.

2. The mobile device of claim 1 wherein the processor is further programmed with instructions to generate the data representative of the voice inputs by:

filtering the voice inputs to remove noise to generate filtered voice inputs; and encoding the filtered voice inputs to generate the data representative of the voice inputs.

3. The mobile device of claim 2 wherein the processor is further programmed with instructions to:

cause the visual status bar to disappear upon contact by the user to a touch sensitive display on the mobile device.

4. The mobile device of claim 1 wherein the processor is further programmed with instructions to:

cause the visual status bar to disappear upon contact by the user to a touch sensitive display on the mobile device.

5. The mobile device of claim 4 wherein the processor is further programmed with instructions to:

display a visual indication that voice inputs by the user are being captured by the mobile device.

6. The mobile device of claim 5 wherein the processor is further programmed with instructions to:

display a visual indication that voice inputs by the user have been recognized as an application command.

7. The mobile device of claim 5 wherein the processor is further programmed with instructions to:

display a visual indication of intermediate results of recognition of voice inputs.

8. The mobile device of claim 5 wherein the processor is further programmed with instructions to:

cause whichever of the visual indication of intermediate results of recognition of voice inputs, and visual indication that voice inputs by the user have been recognized as an application command, is currently being displayed to disappear upon contact by the user to the touch sensitive display on the mobile device.

9. A computer implemented method comprising:

receiving encoded voice data representing commands by a user to navigate and to enter data within an application on a mobile device;

transferring the encoded voice data to a speech recognition engine and receiving from the speech recognition engine textually encoded data representing translation of the encoded voice data to text;

receiving from the mobile device, user context information including geographic location information indicative of current geographic location of the mobile device;

receiving from the mobile device, user interface context information that identifies fields currently displayed to the user by the mobile device from the application;

generating and storing a tag for each item of received user context information; and processing with a machine learning engine the textually encoded data as a function of the user context information and the user interface context information to identify a command for the application that corresponds to the encoded voice data.

10. The computer implemented method of claim 9 wherein the processing with a machine learning engine the textually encoded data as a function of the user context information and the user interface context information to identify a command for the application that corresponds to the encoded voice data comprises:

parsing the textually encoded data employing fuzzy formal language parsing to identify meaningful text structures.

11. The computer implemented method of claim 10 wherein the processing with a machine learning engine the textually encoded data as a function of the user context information and the user interface context information to identify a command for the application that corresponds to the encoded voice data further comprises:

employing a grammar definition to identify a command for the application that corresponds to the encoded voice data.

12. The computer implemented method of claim 11 further comprising:

updating the user context information with newly generated tags.

13. The computer implemented method of claim 12 further comprising:

aggregating tags corresponding to users identified as being within an organization and wherein the processing with a machine learning engine the textually encoded data as a function of the user context information and the user interface context information to identify a command for the application that corresponds to the encoded voice data is further performed with the tags of users within the same organization.

14. The computer implemented method of claim 9 further comprising:

updating the user context information with newly generated tags; and aggregating tags corresponding to users identified as being within an organization and wherein the processing with a machine learning engine the textually encoded data as a function of the user context information and the user interface context information to identify a command for the application that corresponds to the encoded voice data is further performed with the tags of users within the same organization.

15. The computer implemented method of claim 14 further comprising:

processing with a machine learning engine the textually encoded data as a function of the user context information and the user interface context information to generate a recommended text entry for a field in the application.

16. The computer implemented method of claim 9 further comprising:

processing with a machine learning engine the textually encoded data as a function of the user context information and the user interface context information to generate a recommended text entry for a field in the application.

17. The computer implemented method of claim 10 further comprising:

maintaining a dialogue context graph comprising previous commands and wherein the processing with a machine learning engine the textually encoded data as a function of the user context information and the user interface context information to identify a command for the application that corresponds to the encoded voice data is further performed as a function of the dialogue context graph.

* * * * *